(12) United States Patent
Harvey et al.

(10) Patent No.: US 6,196,669 B1
(45) Date of Patent: Mar. 6, 2001

(54) HIGH DURABILITY PRESSURE CONTROL BLADDER FOR USE IN AN INK DELIVERY SYSTEM

(75) Inventors: James A Harvey; Christie Dudenhoefer; William F. King, all of Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/240,490

(22) Filed: Jan. 28, 1999

Related U.S. Application Data

(63) Continuation-in-part of application No. 08/873,612, filed on Jun. 11, 1997, now Pat. No. 5,975,686, which is a continuation-in-part of application No. 08/550,902, filed on Oct. 31, 1995, now Pat. No. 5,872,584, which is a continuation-in-part of application No. 08/518,847, filed on Aug. 24, 1995, now Pat. No. 5,736,992, which is a continuation-in-part of application No. 08/331,453, filed on Oct. 31, 1994, now Pat. No. 5,583,545.

(51) Int. Cl.⁷ ....................................... B41J 2/175
(52) U.S. Cl. ............................................... 347/85
(58) Field of Search ........................ 347/85, 86, 87; 29/890.1

(56) References Cited

U.S. PATENT DOCUMENTS

| | | |
|---|---|---|
| 4,329,698 | 5/1982 | Smith . |
| 4,415,886 * | 11/1983 | Kyogoku et al. ............ 340/618 |
| 4,500,895 | 2/1985 | Buck et al. . |
| 4,509,062 | 4/1985 | Low et al. . |
| 4,749,291 | 6/1988 | Kobayashi et al. . |
| 4,771,295 | 9/1988 | Baker et al. . |
| 4,794,409 | 12/1988 | Cowger et al. . |
| 4,929,969 | 5/1990 | Morris . |
| 4,963,189 | 10/1990 | Hindagolla . |
| 5,153,612 | 10/1992 | Dunn et al. . |
| 5,185,034 | 2/1993 | Webb et al. . |
| 5,278,584 | 1/1994 | Keefe et al. . |
| 5,280,300 | 1/1994 | Fong et al. . |
| 5,359,353 | 10/1994 | Hunt et al. . |
| 5,488,400 * | 1/1996 | Crystal et al. ............ 347/85 |
| 5,583,545 | 12/1996 | Pawlowski, Jr. et al. . |
| 5,736,992 | 4/1998 | Pawlowski, Jr. et al. . |
| 5,750,216 * | 5/1998 | Horino et al. ............ 428/34.3 |
| 5,975,686 * | 11/1999 | Hauck et al. ............ 347/85 |

OTHER PUBLICATIONS

Pending U.S. application No. 08/869,446 filed Jun. 5, 1997 of Olsen et al.

Pending U.S. application No. 08/873,612 filed Jun. 11, 1997 of Hauck et al.

*Hewlett–Packard Journal*, vol. 39, No. 4 (Aug. 1988).

(List continued on next page.)

*Primary Examiner*—N. Le
*Assistant Examiner*—Michael Nghiem

(57) ABSTRACT

A high-durability flexible bladder designed for placement within in an ink containment vessel. When inflated and deflated, the bladder maintains proper pressure levels in the ink containment vessel which improves the operating efficiency of the entire printing system. The bladder has a specially-constructed side wall that prevents air and ink materials from passing therethrough and is characterized by a high degree of structural integrity and longevity. The side wall is produced from polyethylene naphthalate which provides the benefits listed above. Either a single material layer produced in whole or in part from polyethylene naphthalate may be used or a plurality of material layers can be employed in combination to manufacture the side wall, with at least one layer containing in whole or in part polyethylene naphthalate. As a result, problems involving premature bladder deterioration, leakage, and the like are avoided.

13 Claims, 4 Drawing Sheets

OTHER PUBLICATIONS

*Encyclopedia of Polymer Science and Engineering* (Kroschwita, J. ed.), vol. 9 (entitled Liquid Crystalline Polymers to Mining Applications), John Wiley & Sons, Inc., New York (1987), pp. 1–8.

Product Literature Sheet from Hoechst Celanese entitled "Vectra® Liquid Crystal Polymer", Short Term Properties (VC–4)—(1992).

Product Literature Sheet from Hoechst Celanese entitled "Processing Vectra® Liquid Crystal Polymer", Processing and Troubleshooting Guide (VC–6)—(1992).

Kaslusky, A., "New resins form complex heat–resistant parts without warping", *Modern Plastics Encyclopedia* 1998, (Mid–Nov. 1997 edition), p. B–69.

* cited by examiner

HIGH DURABILITY PRESSURE CONTROL BLADDER FOR USE IN AN INK DELIVERY SYSTEM

CROSS-REFERENCES TO RELATED APPLICATIONS

This application is a continuation-in-part of U.S. patent application Ser. No. 08/873,612 to Hauck et al. entitled REGULATOR FOR A FREE-INKJET PEN filed on Jun. 11, 1997 (now U.S. Pat. No. 5,975,686, which is a continuation-in-part of U.S. patent application Ser. No. 08/550,902 to Hauck et al. entitled APPARATUS FOR PROVIDING INK TO AN INKJET PRINTHEAD AND FOR COMPENSATING FOR ENTRAPPED AIR filed on Oct. 31, 1995 (now U.S. Pat. No. 5,872,584, which is a continuation-in-part of U.S. patent application Ser. No. 08/518,847 to Pawlowski Jr. entitled PRESSURE REGULATED FREE-INK INKJET PEN filed on Aug. 24, 1995 (now U.S. Pat. No. 5,736,992) which is a continuation-in-part of U.S. patent application Ser. No. 08/331,453 to Pawlowski Jr. et al. entitled INK LEVEL DETECTION IN A PRESSURE REGULATED PEN filed on Oct. 31, 1994 (now U.S. Pat. No. 5,583,545).

BACKGROUND OF THE INVENTION

The present invention generally relates to ink printing technology, and more particularly to a specialized bladder system for controlling internal pressure levels in an ink containment vessel which is resistant to the corrosive effects of ink materials. The bladder has a novel side wall structure which accomplishes this goal and also prevents the undesired passage of gases (e.g. air) and ink materials therethrough. As a result, the overall longevity and operational efficiency of the entire ink delivery system is improved.

Substantial developments have been made in the field of electronic printing technology. A wide variety of highly-efficient printing systems currently exist which are capable of dispensing ink in a rapid and accurate manner. Thermal inkjet systems are especially important in this regard. Printing units using thermal inkjet technology basically involve an apparatus which includes at least one ink reservoir chamber in fluid communication with a substrate (preferably made of silicon) having a plurality of thin-film heating resistors thereon. The substrate and resistors are maintained within a structure that is conventionally characterized as a "printhead". Selective activation of the resistors causes thermal excitation of the ink materials and expulsion thereof from the printhead. Representative thermal inkjet systems are discussed in U.S. Pat. No. 4,500,895 to Buck et al.; No. 4,794,409 to Cowger et al.; No. 4,509,062 to Low et al.; No. 4,929,969 to Morris; No. 4,771,295 to Baker et al.; No. 5,278,584 to Keefe et al.; and the Hewlett-Packard Journal, Vol. 39, No. 4 (August 1988), all of which are incorporated herein by reference.

The ink delivery systems described above (and other units using different ink ejection devices as indicated below) typically include an ink storage unit (e.g. a housing, vessel, or tank) having a self-contained supply of ink therein in order to form an ink cartridge. In a standard ink cartridge, the ink containment unit is directly attached to the operating components of the cartridge to produce an integral and unitary structure wherein the ink supply is considered to be "on-board". However, in other cases, the ink storage unit will be provided at a remote location within the printing system, with the ink storage unit being operatively connected to and in fluid communication with the printhead using one or more tubular ink transfer conduits. These particular systems are conventionally known as "off-axis" printers. Representative off-axis printing systems are illustrated and described in, for example, co-owned pending U.S. patent application No. 08/869,446 (filed on Jun. 5, 1997) entitled "AN INK CONTAINMENT SYSTEM INCLUDING A PLURAL-WALLED BAG FORMED OF INNER AND OUTER FILM LAYERS" (Olsen et al.) and co-owned U.S. Pat. No. 5,975,686 which are both incorporated herein by reference. The present invention shall be applicable to both of these designs (regardless of where the ink storage or containment vessel is located), and may likewise be used in connection with printing devices that employ non-thermal-inkjet technology. Accordingly, while the claimed invention shall be described herein with primary reference to thermal inkjet printing systems, it is also applicable to any ink delivery apparatus which employs a housing or vessel containing a supply of ink therein that is ultimately delivered using at least one ink ejector.

An important consideration in the development of a printing system is the maintenance of proper fluid pressure levels within the ink containment vessel(s) of the system. This factor is particularly important in off-axis systems which normally have fairly large ink supplies associated therewith. While the present invention shall again be applicable to both off-axis and self-contained cartridge-type units as previously noted, it shall be discussed herein with primary reference to off-axis systems and the components associated therewith which will be described in greater detail below. In order to reduce printing system costs and to likewise facilitate a reduction in the operating expense per printed page, off-axis printing systems were developed as previously noted. Off-axis printers basically involve one or more small moving printheads having at least one ink ejector therein (described above) which are connected to relatively large stationary ink storage reservoirs using at least one tubular conduit. In these particular systems, the mass (e.g. weight) of the printhead is significantly reduced so that the overall cost of the printhead drive system and printer size can be minimized. Furthermore, in most cases, this type of system is more economical to operate compared with conventional self-contained ink cartridge units since the ink storage reservoir in an off-axis system can be replaced without requiring replacement of the entire printhead assembly. Accordingly, off-axis printing systems (regardless of the particular ink ejectors being employed) provide many important benefits.

However, typical off-axis printers also include numerous "ink flow restrictions" between the ink storage reservoir and the printhead. These ink flow restrictions (which basically involve barriers to the continuous flow of ink through the system) include but are not limited to (1) multiple internal orifices through which the ink must flow during delivery to the printhead; (2) narrow ink delivery conduits; and (3) shut-off valves. To overcome ink transfer problems caused by these restrictions, the ink compositions originally retained within the ink storage reservoir are transported to the printhead at elevated pressure levels (discussed below). Likewise, to avoid excessive pressure levels which result from this type of system, a pressure reducer/controller is used in order to deliver ink to the printhead at an optimum "back pressure". The term "back pressure" as used herein is generally defined to involve the fluid pressure inside the ink containment vessel during operation.

With continued reference to off-axis printing systems (as well as cartridge-type units with "on-board" ink supplies), it is important that the ink back pressure at the printhead be maintained at a consistent level. Changes in back pressure can adversely affect print density and image quality. Specifically, major changes in back pressure can cause numerous problems including the uncontrolled "drooling" or leakage of ink from the printhead nozzles, depriming of the printing system, and the like. It is therefore highly desirable to create an internal environment within the printing system where the back pressure levels are maintained at a stable, consistent, and minimal level.

There are several causes for undesired changes in system back pressure. One cause of primary importance involves the trapping of air within the printing system (particularly the ink containment vessel or other storage chamber operatively connected to the printhead), followed by changes in environmental parameters including altitude and temperature. As used throughout this discussion, the term "air" shall be broadly defined to encompass not only air from internal and external sources, but volatile compositions which outgas from the ink materials being delivered, as well as other gases which are ambiently present in the printing system. Representative and non-limiting volatile compositions used in connection with ink formulations as "vehicles", "solvents", "humectants", and the like include but are not limited to water and organic materials such as 2-pyrrolidone, 1,5-pentanediol, N-methyl pyrrolidone, 2-propanol, ethoxylated glycerol, 2-ethyl-2-hydroxymethyl-1,3-propanediol, cyclohexanol, and others known in the art for this purpose. Air (and/or other gaseous materials as defined above) entrapped within an ink delivery system will interact in accordance with the "Ideal Gas Law" [PV=nRT] wherein changes in any one of the parameters associated with this formula (e.g. temperature, volume, etc.) will cause corresponding changes in printhead back pressure. These changes are undesirable for the reasons given above. Finally, an additional problem which causes changes in system back pressure involves a delay which typically occurs between the time the printhead begins ejecting ink to the point at which operation of the selected pressure regulator is initiated.

Regarding a preferred sub-system for controlling back pressure levels in an ink delivery apparatus, the present invention primarily (but not exclusively) involves the use of a specialized arrangement of components which will now be discussed. The pressure control system of primary interest in this case is summarized in co-owned U.S. Pat. No. 5,975,686 which is referenced above, incorporated herein by reference, and relied upon for priority in this case. More detailed information regarding this particular pressure control system will be presented below in the Detailed Description of Preferred Embodiments section. Basically, this type of system employs multiple components which cooperate to precisely regulate back pressure levels within the ink containment vessel in the printer unit of interest. Subject to a more in-depth discussion provided below, this back pressure control system involves the use of an external ink supply stored within a "reservoir" which is in fluid communication with a chamber (also known as an "accumulator" or "ink containment vessel"). Fluid communication occurs via one or more tubular ink flow conduits. The term "tubular" as used herein shall encompass a structure having a central passageway therethrough that is surrounded by a continuous side wall. It should be noted that the term "ink containment vessel" as used herein shall involve any vessel (or vessels) which are designed to contain ink that is ultimately delivered to the printhead. In the example provided above (and discussed in U.S. Pat. No. 5,975,686 the ink containment vessel primarily involves the "accumulator" structure directly associated with the printhead as indicated below. However, this term may also be construed to cover the ink reservoir unit in the system if pressure control is needed therein. It should therefore be understood that the claimed invention shall not be limited to any particular location or type of ink containment vessel which can encompass any housing, tank, or equivalent structure designed to retain ink therein for subsequent transfer to a printhead.

In the system of U.S. Pat. No. 5,975,686 the ink containment vessel is, in turn, operatively connected to and in fluid communication with a printhead containing one or more ink ejectors. In a non-limiting and preferred embodiment, the ink ejectors will consist of thin-film resistors. The term "operatively connected" as previously noted shall involve a system in which the printhead is directly connected to the ink containment vessel or in fluid communication therewith using one or more intermediate transfer structures including but not limited to single or multiple tubular conduits.

Positioned within the ink containment vessel (which, in this non-limiting embodiment, functions as an "accumulator" as previously noted) is a back pressure regulator. The term "back pressure" is defined above. The regulator maintains the fluid back pressure in the ink containment vessel/printhead at a substantially constant value so that ink is supplied to the printhead in a complete and uniform manner. This goal is accomplished using a very special component that is again described in U.S. Pat. No. 5,975,686. Basically, a plurality of spring-biased lever members (in the form of "arm-like" structures) are provided within the ink containment vessel that resiliently engage an inflatable (and deflatable) bag member characterized herein as a flexible "bladder". The interior region of the bladder (e.g. the inside of this component) is in fluid communication with ambient air through a series of valves and other related components. The term "bladder" shall encompass a wide variety of different devices including but not limited to any flexible inflatable/deflatable structure regardless of shape, form, or material which is designed to receive one or more fluids (optimally gases) therein.

As back pressure conditions inside the ink containment vessel change, the bladder is designed to inflate and deflate as discussed in greater detail below. Inflation and deflation of the bladder will activate various valves and/or change the volumetric characteristics of the ink containment vessel. This process will accurately control back pressure levels within the ink containment vessel and accompanying printhead. However, to ensure maximum effectiveness, it is important that the bladder have a high degree of structural integrity, longevity, and resistance to chemical deterioration (e.g. "corrosion") by ink materials. Corrosive ink ingredients are discussed above and typically involve organic solvents, acidic dyes, and the like. The bladder should likewise have a side wall which is able to prevent the leakage of air (also defined above) and ink materials into the bladder. The leakage of these compositions into the bladder could cause undesired pressure imbalances and a loss of effectiveness.

Prior to development of the present invention, a substantial need existed for a flexible pressure control bladder designed for use in an ink containment vessel which is resistant to ink corrosion problems, prevents air passage through the bladder side wall, and is characterized by improved longevity. The claimed invention satisfies these needs in a unique and effective manner. Specifically, a novel pressure control bladder, an ink delivery system using the bladder, and a method for producing an efficient ink delivery system are disclosed which provide many benefits. These benefits include (1) the avoidance of ink-based bladder deterioration problems; and (2) the prevention of air, ink, and other materials from passing through the bladder side wall. As a result, high levels of operating efficiency, print quality, pressure control, and longevity are maintained in connection with the ink delivery system under consideration. These and other benefits associated with the claimed invention (as well as the specific features thereof) shall be discussed in considerable detail below.

As a further preliminary note, it shall be understood that the construction materials and bladder designs provided in the Detailed Description of Preferred Embodiments section are not restricted to any particular ink delivery system including the one shown in co-owned U.S. Pat. No. 5,975,686. Instead, the materials, components, methods, and techniques claimed in this case are applicable to any ink delivery system in which a flexible bladder is employed within a chamber containing ink materials in order to achieve proper ink delivery and effective pressure control, with the invention also being applicable to ink storage bladder units in which a supply of ink is retained directly therein.

SUMMARY OF THE INVENTION

It is an object of the present invention to provide an improved ink delivery system in which the components of the system are characterized by a high degree of longevity, structural integrity, and resistance to the corrosive effects of ink materials.

It is another object of the invention to provide an improved ink delivery system which employs a flexible bladder unit therein which, when inflated and deflated, effectively controls back pressure levels within the system.

It is another object of the invention to provide an improved ink delivery system which employs a flexible bladder therein for pressure control or other purposes that is characterized by substantially improved longevity.

It is another object of the invention to provide an improved ink delivery system which employs a flexible bladder therein with a side wall that prevents the passage of air and/or other gases therethrough.

It is another object of the invention to provide an improved ink delivery system which employs a flexible bladder therein with a side wall that prevents the passage of ink materials therethrough and is otherwise resistant to the corrosive effects of ink compounds.

It is another object of the invention to provide an improved ink delivery system which employs a flexible bladder therein having the desirable characteristics listed above that is readily used many different printing systems, configurations, devices, and processes.

It is a further object of the invention to provide an improved ink delivery system which employs a flexible bladder therein having the desirable characteristics listed above which may be used in connection with a wide variety of different ink compounds.

It is a further object of the invention to provide an improved ink delivery system which employs a flexible bladder therein that can be used in both self-contained cartridge-type systems having an on-board ink supply and in off-axis units with an ink supply remotely positioned from the printhead.

It is a further object of the invention to provide an improved ink delivery system which employs a flexible bladder therein that provides a high degree of resiliency, yet is characterized by improved strength and longevity.

It is an even further object of the invention to provide an improved ink delivery system which employs a flexible bladder therein that is readily manufactured in an economical manner.

It is an even further object of the invention to provide an improved ink delivery system which employs a flexible bladder therein that can be used in both inkjet and non-inkjet printing systems.

It is an even further object of the invention to provide a method for producing a high-efficiency ink delivery system which employs a special pressure control bladder that offers the important benefits listed above.

The specialized high-durability bladder members, ink delivery systems incorporating the bladders, and other important aspects of the claimed invention will now be summarized. More detailed information along with a discussion of specific construction materials and processing parameters will be provided below in the Detailed Description of Preferred Embodiments section.

In accordance with the present invention, a specialized bladder-type pressure control system is provided which is characterized by a strong resistance to the corrosive effects of ink materials and an overall increase in longevity. For the purposes of this invention "corrosion" shall be defined to encompass a condition which involves the chemical and/or physical deterioration of the structures under consideration which, in this case, primarily involve the pressure control bladder.

As discussed in considerable detail below, a flexible bladder is provided for use in an ink containment vessel which, when inflated and deflated, maintains proper back pressure levels inside the ink containment vessel (with the phrase "back pressure" being defined above). The term "bladder" shall be construed in a broad manner to again encompass a wide variety of different devices including but not limited to any inflatable/deflatable structure regardless of shape, form or material which is designed to receive one or more fluids (optimally gases) therein. The details associated with this type of system will be discussed below and are again described in co-owned U.S. Pat. No. 5,975,686. However the citation of this particular system is provided with the understanding that it is for reference purposes only and shall not be construed as limiting. It should also be noted that, in an alternative embodiment, the bladder structures of the present invention can perform other functions aside from pressure control including ink retention. Nonetheless, the primary embodiment in this case is directed to pressure control as outlined in the Detailed Description of Preferred Embodiments section.

The bladder unit further comprises a side wall which prevents air and ink materials from passing therethrough in a unique and effective manner compared with prior systems. As previously discussed, the term "air" shall be broadly construed to encompass not only air from internal and external sources, but volatile compositions which outgas from the ink materials being delivered, as well as other gases which are ambiently present in the printing system. In a preferred embodiment, the side wall of the bladder is comprised of a material designated herein as "polyethylene naphthalate" (e.g. "PEN") which is also known as a homopolymer of dimethyl 2,6-naphthalenedicarboxylate and ethylene glycol. It specifically has the following chemical structure:

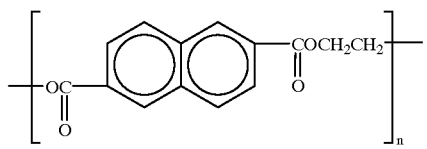

In a non-limiting preferred embodiment, n=about 10–1000 in the above-listed structure.

Regarding the chemical characteristics of this material, they involve a tensile strength of 32,000 lbs./sq. in. and a tensile modulus of 750,000 lbs./sq. in. These parameters were determined according to a standardized procedure referenced in ASTM D-882-88. The water vapor transmission rate of polyethylene naphthalate has been reported in the vicinity of 3.6 gm/m$^2$/day. Polyethylene naphthalate also has a glass transition temperature ($T_g$) of approximately 120° C. and a melting temperature of 262° C. Compared to, for example, polyethylene terephthalate ("PETE"), polyethylene naphthalate has a 43° C. higher glass transition temperature, a 50% higher tensile modulus, a 33% higher tensile strength, a five-fold improvement in its ability to function as a gas barrier (as measured in accordance with biaxially-oriented films), a three-fold improvement in hydrolysis resistance, a four-fold enhancement in moisture barrier capacity, and greater chemical resistance. In this regard, polyethylene naphthalate is highly beneficial when used to manufacture the side wall of an ink containment vessel in accordance with its considerable degree of chemical resistance to the corrosive effects of ink materials, the ability to withstand relatively high temperatures which are traditionally encountered during the manufacturing processes associated with ink containment vessel fabrication, low moisture absorption, low water vapor transmission, a high retention of tensile strength even after being exposed to hydrolysis conditions, a high continuous use temperature in an electrical environment, and the ability to be formed into many shapes in a rapid and effective manner using conventional injection molding techniques. Polyethylene naphthalate provides all of these benefits yet is economical from a material cost standpoint. Thus, the use of polyethylene naphthalate for the purposes specified herein offers many advantages and represents a significant technical advance in the art of ink containment vessel fabrication.

While polyethylene naphthalate may be obtained from a number of different sources, it is commercially available from, for example, Imperial Chemical Industries ("ICI") of Wilmington, Del. (USA) under the trademark "KALADEX" and from Amoco Polymers, Inc. of Alpharetta, Ga. (USA).

The phrase "comprised of polyethylene naphthalate" (which is the chemical composition of primary interest in this case) shall be construed to encompass any type of side wall structure provided that it has at least some polyethylene naphthalate therein. Exemplary side wall structures incorporated within this definition include but are not limited to (1) single-component (e.g. mono-layer) side walls made in whole or in part of polyethylene naphthalate; and (2) composite side walls made from multiple material layers in which at least one of the layers contains in whole or in part polyethylene naphthalate. In this regard, the present invention shall not be restricted to any particular side wall configuration provided that it includes at least some polyethylene naphthalate as a primary active component designed to impart improved ink resistance, durability, structural integrity, and the like.

In a preferred and non-limiting embodiment, a single material layer comprised entirely or partially of polyethylene naphthalate will be employed having an exemplary and optimum thickness of about 0.25–3.0 mil (typical=about 1.0 mil), with 1.0 mil=0.001 inch. It should be understood that this range (as well as all other numerical values expressed herein) shall not limit the invention in any respect unless otherwise indicated. Numerical parameters presented throughout this discussion shall be considered exemplary only and may be changed as needed in accordance with routine preliminary pilot testing involving a number of factors including the size, type, and desired capacity of the printing system under consideration.

As previously noted, the claimed invention not only encompasses a bladder side wall of single layer construction made entirely of polyethylene naphthalate, but shall also cover a single layer produced from "blends" of polyethylene naphthalate and one or more other materials. This embodiment shall not be restricted to any particular compounds which may be blended with the polyethylene naphthalate. A number of different compositions are suitable for this purpose. However, in a preferred and non-limiting system, one or more organic polymers will be employed, with a non-exhaustive list of exemplary materials suitable for this purpose being as follows: polyvinylidene chloride, polyvinylidene fluoride, ethylene vinyl alcohol copolymer, polyethylene, ethylene chlorotrifluoroethylene copolymer, polychlorotrifluoroethylene, at least one liquid crystal polymer, and mixtures thereof. Various other compositions (preferably organic in character) may also be combined with the polyethylene naphthalate in addition to or instead of those listed above as determined by routine preliminary testing. The term "organic polymer" as used herein shall be interpreted in a conventional manner to involve a carbon-containing molecule which includes a repeating chain of chemical sub-units.

This particular embodiment shall also not be limited to any material quantities in connection with polyethylene naphthalate "blends" (with any appreciable amounts of polyethylene naphthalate providing improved results compared with bladders which do not contain any of this material). However, it is preferred in a non-limiting manner that any polyethylene naphthalate "blend" that is used to manufacture the side wall of the bladder in the present embodiment (or any other embodiments which employ at least one polyethylene naphthalate layer of material) contain at least about 50% or more by weight polyethylene naphthalate.

The present invention shall also encompass the use of a bladder side wall which incorporates a plurality of material layers that are laminated or otherwise secured together. In this type of system, at least one of the layers is comprised in whole or in part of polyethylene naphthalate as discussed above, with at least another one of the layers being comprised of an additional reinforcement composition. The selection of a single layer or multi-layer configuration when producing the bladder shall again be undertaken in accordance with routine preliminary testing taking into account, for example, the type of ink being delivered and its corrosive character. Many different layer arrangements and groupings can be employed in this embodiment without limitation. Representative multi-layer side wall structures will be presented below in the Detailed Description of Preferred Embodiments section. Regarding the additional reinforcement compositions which may be employed for this purpose, such compositions will (as a group) have the common ability to resist the passage of ink materials and/or air therethrough in a manner that augments the high-durability character of polyethylene naphthalate and is chemically compatible (e.g. non-reactive) therewith. Exemplary and preferred materials suitable for use as additional reinforcement compositions include but are limited to the following compounds: polyvinylidene chloride, polyvinylidene fluoride, ethylene vinyl alcohol copolymer, polyethylene, ethylene chlorotrifluoroethylene copolymer, polychlorotrifluoroethylene, at least one liquid crystal polymer, at least one elemental metal, aluminum oxide, silicon dioxide, diamond-like carbon, and mixtures thereof. The selected material(s) used in connection with the additional reinforcement composition will preferably involve one or more organic polymers, with the term "organic polymer" being defined above.

In a multi-layer system, the thickness of each layer will vary depending on the construction materials being used and other related factors. However, in a preferred embodiment designed to provide optimum results, the layer which contains in whole or in part polyethylene naphthalate will have a preferred, non-limiting thickness of about 0.25–3.0 mil (typical=about 1.0 mil).

While many different layer arrangements can be again employed in this embodiment (provided that at least one of the layers contains in whole or in part polyethylene naphthalate), an exemplary and preferred multi-layer system to be discussed in considerable detail below includes (1) an upper layer comprised in whole or in part of polyethylene as discussed above; (2) a lower layer comprised in whole or in part of polyethylene; and (3) a medial layer positioned between the upper layer and the lower layer which is comprised in whole or in part of polyethylene naphthalate as discussed above. To achieve optimum results in this embodiment, the upper layer will have a representative and non-limiting thickness of about 0.25–3.0 mil (typical=about 1.0 mil), with the lower layer having a thickness of about 0.25–3.0 mil (typical=about 1.0 mil) and the intermediate layer having a preferred thickness range of about 0.25–3.0 mil (typical=about 1.0 mil).

In addition to providing a novel bladder structure with unique durability characteristics as discussed above, the present invention also encompasses an ink delivery system for use in printing images on a substrate which includes a printhead comprising at least one ink ejector for expelling ink on demand from the printhead. Exemplary and preferred ink ejectors will involve the thin film resistor elements that are traditionally used in thermal inkjet systems, although other ink ejectors are applicable as discussed below which range from piezoelectric elements to dot-matrix components.

The term "ink delivery system" shall, without limitation, encompass a wide variety of different devices including cartridge units of the "self-contained" variety having a supply of ink stored directly therein. Also included within this term are printing units which employ a printhead connected by one or more conduit members (or similar structures) to a remotely-positioned ink reservoir in the form of a tank, vessel, housing, or other structure. The latter system (traditionally identified as an "off-axis" unit as previously noted) is the primary system of interest in the current description with the understanding that the invention shall not be limited to this particular apparatus.

Furthermore, the term "operatively connected" as used to define the interrelationship between the printhead and the ink containment vessel shall be broadly construed to encompass (A) a system in which the ink containment vessel is directly attached to and in fluid communication with the printhead to form, for example, a single cartridge unit having an "on-board" ink supply as noted above; and (B) a system in which the ink containment vessel is remotely spaced from the printhead and not "directly" attached thereto, preferably of the off-axis variety. In system (B), the ink containment vessel is optimally in fluid communication with the printhead using at least one ink supply/transfer conduit connected to and between the printhead and ink containment vessel. Both of these systems shall be applicable to all of the various embodiments of the claimed bladder structures, ink containment vessels incorporating the bladders, and methods associated therewith.

Operatively connected to the printhead having the ink ejector system associated therewith is an ink containment vessel. The ink containment vessel shall encompass any type of chamber, housing, tank, and the like in any shape, form, or capacity (although its ability to function as an ink reservoir or "accumulator" is of primary interest as discussed below.) Accordingly, the phrase "ink containment vessel" as used herein shall involve any vessel (or vessels) which are designed to contain ink that is ultimately delivered to the printhead. In the example discussed in U.S. Pat. No. 5,975,686 the ink containment vessel primarily involves the "accumulator" structure directly associated with the printhead. However, this term may also be construed to cover one or more ink reservoir units that feed the accumulator.

Positioned within the ink containment vessel (regardless of its location or function) is a flexible bladder as discussed above, with all of the previously-described bladder designs being applicable thereto and incorporated by reference in this section of the present discussion. The bladder is designed so that, when inflated and deflated, it will maintain proper back pressure levels within the ink containment vessel while avoiding ink corrosion and air leakage problems. While the main function of the bladder involves pressure control, the unique bladder structures described herein may instead be used to retain ink materials therein. In such an embodiment, the containment vessel will primarily operate as a protective housing. Accordingly, the claimed ink delivery systems shall not be restricted to any particular functional features of the bladder. Likewise, as previously noted, a bladder of any shape, size, capacity, or layering arrangement can be employed provided that at least one of the layers in the bladder side wall contains in whole or in part polyethylene naphthalate.

The invention described herein shall further encompass a general method for producing a high-durability, low maintenance ink delivery system which is able to maintain proper pressure levels within the system. As previously noted, the system of primary interest involves a flexible pressure control bladder positioned within an ink containment vessel in an ink delivery system, with all of the definitions, terms, and numerical parameters listed above in connection with previous embodiments being fully applicable to this embodiment.

The claimed method includes the steps of (1) providing a printhead comprising at least one ink ejector for expelling ink on demand from the printhead and an ink containment vessel as defined above which is operatively connected to and in fluid communication with the printhead; and (2) placing a flexible bladder within the ink containment vessel which, when inflated and deflated, maintains proper pressure levels within the ink containment vessel. The bladder has a side wall comprised in whole or in part of polyethylene naphthalate which prevents air and ink materials from passing therethrough so that the operational efficiency of the bladder is maintained. In a further alternative method, all of the above-listed steps are employed except that a multi-layer bladder side wall is used. The multi-layer side wall is comprised of a plurality of material layers secured together, with at least one of the layers being made in whole or in part of polyethylene naphthalate and at least another one of the layers being comprised of an additional reinforcement composition. Representative additional reinforcement compositions are listed above along with other information concerning the multi-layer bladder member which shall be entirely applicable to and incorporated by reference relative to the claimed method. As a result of this method, a durable system is created which is not only characterized by the ability to provide accurate pressure control but also has substantially improved longevity and ink corrosion resistance.

In summary, the present invention represents a significant advance in the art of ink printing technology. The structures, components, and methods outlined in detail below offer many important benefits including: (1) the avoidance of ink corrosion problems and air leakage into and out of the bladder in the ink delivery system; (2) improved system longevity as previously noted; and (3) the maintenance of high print quality levels over time with minimal maintenance requirements. These and other benefits, objects, features, and advantages will now be discussed in the following Brief Description of the Drawings and Detailed Description of Preferred Embodiments.

BRIEF DESCRIPTION OF THE DRAWINGS

Any reference numbers carried over from one drawing figure to other drawing figures shall constitute common subject matter applicable to all of the drawing figures under consideration. Likewise, some or all of the drawing figures presented herewith are shown in enlarged schematic format for illustrative purposes.

DETAILED DESCRIPTION OF PREFERRED EMBODIMENTS

Figure 1:
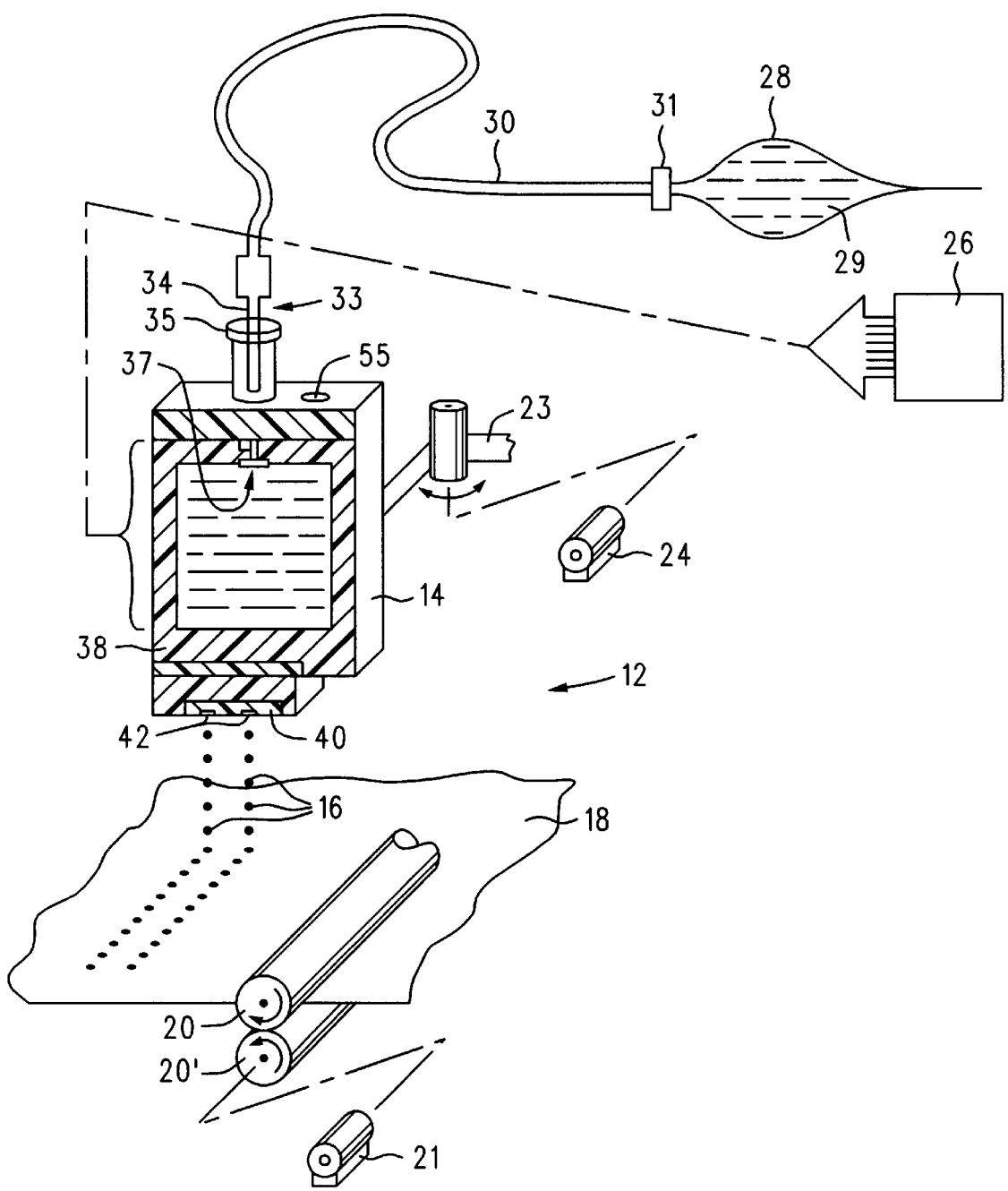
FIG. 1 is a schematically-illustrated view (for background information purposes) of the components, materials, and processes used in a representative ink delivery system which may be employed in connection with the present invention.

In accordance with the present invention, a unique, highly effective, and specialized ink delivery system is provided which offers numerous benefits. This system (in a preferred configuration) employs an internal control unit which maintains proper back pressure levels within the system during operation. As a result, the smooth, continuous, and uninterrupted flow of ink materials from the printer to the desired substrate is ensured. It shall be understood that the present invention is not limited to any particular type of ink delivery system and is prospectively applicable to any apparatus which includes a printhead, at least one ink ejector (defined below), and an ink containment vessel operatively connected to and in fluid communication with the printhead. The term "ink delivery system" shall, without limitation, again involve a wide variety of different devices including cartridge units of the "self-contained" type having a supply of ink stored directly therein. Also encompassed within this term are printing units which employ a printhead connected by one or more tubular conduits (or similar structures) to a remotely-positioned ink containment unit in the form of a tank, vessel, housing, or other structure having an internal cavity therein. The latter system (traditionally identified as an "off-axis" unit) is of primary interest in the present case with the understanding that the invention shall not be limited to this type of apparatus.

Furthermore, as previously noted, the term "operatively connected" as used to define the interrelationship between the printhead and the ink containment vessel shall be broadly construed to encompass (A) a system in which the ink containment vessel is directly attached to and in fluid communication with the printhead to form, for example, a single cartridge unit having an "on-board" ink supply; and (B) a system in which the ink containment vessel is remotely spaced from the printhead and not "directly" attached thereto. In system (B), the ink containment vessel is preferably in fluid communication with the printhead using at least one tubular ink supply/transfer conduit connected to and between the printhead and ink containment vessel which constitutes an off-axis system as previously noted. Both of these systems shall be applicable to all of the various embodiments of the invention outlined below including the claimed ink delivery systems, flexible bladders, and methods associated therewith.

Of primary concern in the present invention is a system which employs a flexible bladder to control and otherwise stabilize back pressure levels within an ink containment vessel (also known as an "accumulator" in the present embodiment). The ink containment vessel is operatively attached to a printhead. The term "back pressure" as used herein is defined above. This type of system and its operation are described in U.S. Pat. No. 5,975,686 (incorporated herein by reference as noted above) from which this case claims priority. Accordingly, all of the details, operational characteristics, features, and other aspects of this system (including a discussion of back pressure) are described in the foregoing application and will only be briefly reviewed in the current case. It is important to emphasize that the present invention is not particularly directed to the mechanics, operation, and construction of the foregoing system (or any other ink delivery unit). It instead involves a novel bladder apparatus and the use of specialized materials to produce the bladder in order to avoid the problems listed above. These problems include deterioration of the bladder caused by corrosive ink materials, along with undesired air and ink passage through the bladder side wall. Once again, the term "air" shall be broadly construed to encompass not only air from internal and external sources, but volatile compositions which outgas from the ink materials being delivered, as well as other gases which are ambiently present in the printing system.

As a further note, it is again important to emphasize that the following information regarding the particular system associated with U.S. Pat. No. 5,975,686 is being presented for background purposes and is non-limiting. The invention may likewise be used in connection any flexible bladder positioned within an ink containment vessel operatively connected to an ink ejector-containing printhead without restriction to any particular use for the bladder. The bladder may be employed for pressure control (preferred), ink storage, and the like.

Finally, as previously stated, the ink containment vessel recited and claimed herein shall encompass any type of chamber, housing, tank, and the like in any shape, form, or capacity (although its ability to function as an ink reservoir or "accumulator" is of primary interest.) Accordingly, the phrase "ink containment vessel" shall involve any vessel (or vessels) which are designed to contain ink that is ultimately delivered to the printhead. In the example discussed in U.S. Pat. No. 5,975,686 the ink containment vessel primary involves the "accumulator" directly attached to the printhead. However, this term may also be construed to cover one or more ink reservoir units that feed the accumulator.

A. Representative Ink Delivery Systems

With reference to FIGS. 1–5, the ink delivery system associated with U.S. Pat. No. 5,975,686 is described. As illustrated in FIG. 1, reference number 12 generally involves a printer unit (also characterized as an "ink delivery system") which includes a "pen" 14 that is designed to expel drops 16 of ink on-demand. The drops 16 form images on a printing medium or "substrate" designated at reference number 18 in FIG. 1. The pen 14 likewise includes a printhead containing one or more ink ejectors as discussed further below. During operation, the substrate 18 is moved laterally relative to the pen 14 by a motor 21 that is mechanically coupled to print rollers 20, 20' that engage the substrate 18. The pen 14 is likewise moved in a reciprocating fashion back and forth across the substrate 18 by a corresponding drive belt 23 and motor 24 schematically illustrated in FIG. 1. The printhead and operating components thereof are controlled by an appropriate electrical circuit 26, with the printhead being discussed further below. In this manner, ink delivery is effectively accomplished which enables a printed image to be formed on the substrate 18.

In the system of FIG. 1 (which involves an "off-axis" design), an ink reservoir unit 28 optimally in the form of a flaccid bag-like structure is provided which contains a supply of ink therein that is designated in FIG. 1 at reference number 29. The ink reservoir unit 28 may be refillable or non-replenishable in accordance with the particular system under consideration. In a preferred embodiment, the ink reservoir unit 28 is pressurized to an ideal level of between about −5 inches of water to about +60 inches or more of water for delivery to the pen 14. The ink reservoir unit 28 is operatively connected to and in fluid communication with the pen 14 using a flexible tubular conduit 30 and standard interconnect hardware 31. In a preferred embodiment, these components likewise include a valve (not shown) that closes when the ink reservoir unit 28 is separated from the conduit 30 so that the ink 29 does not leak from either the reservoir unit 28 or the conduit 30. Likewise, closure of the valve prevents air from entering the conduit 30.

The conduit 30 terminates at position 33 shown in FIG. 1 which involves standard interconnect hardware preferably consisting of a hollow, blunt needle 34. The needle 34 is designed to pierce a septum 35 and thereby establish fluid communication between the conduit 30 and the ink containment vessel associated with the pen 14 (discussed further below). Within the pen 14, the supply of ink 29 is delivered to a back pressure regulator 37 (discussed in considerable detail below and schematically illustrated in FIG. 1) which is designed to maintain the back pressure within the pen 14 at a consistent level. The benefits associated with back pressure maintenance are discussed above and incorporated in this section by reference. Ideal back pressure levels (which will vary from system to system) can range from about 0 to −50 inches of water depending on the design of the printhead, although the preferred/optimum range is about −2 to −7 inches of water.

With continued reference to FIG. 1, the pen 14 basically consists of an ink containment vessel shown at reference number 38 which functions as an ink "accumulator" (e.g. an ink storage vessel/delivery unit). The ink containment vessel 38 includes a housing having an internal compartment therein as illustrated. Again, other ink containment vessels may be used in the present invention, with the vessel 38 shown in FIG. 1 being provided for example purposes only. Operatively connected to and in fluid communication with the ink containment vessel 38 is a printhead designed at reference number 40 which will now be briefly discussed. In accordance with the invention, the printhead 40 may be directly connected to any type of ink containment vessel (in the form of a housing, chamber, tank, and the like) or remotely attached to such a structure using one or more tubular conduits. In the embodiment of FIG. 1, the printhead 40 is directly secured to the ink containment vessel/accumulator 38 but is remotely attached (and operatively connected) to the ink reservoir unit 28 via conduit 30 and intervening components as discussed above. In this non-limiting configuration, the printhead 40 is operatively connected to and in fluid communication with both the ink reservoir unit 28 and the ink containment vessel 38.

The printhead 40 further includes at least one or more ink ejectors 42 associated therewith. While this invention shall be described herein with primary reference to thermal inkjet technology, many different ink ejectors can be employed. The term "ink ejector" shall be defined to involve any component, device, element, or structure which may be used to expel ink on-demand from a printhead. In a thermal inkjet system (which is the preferred system of interest in this case), the ink ejectors 42 will consist of one or more individually-energizable thin-film resistors that are preferably fabricated from a tantalum-aluminum composition known in the art for resistor construction. Specific information regarding this type of ink ejection system is provided in U.S. Pat. No. 4,500,895 to Buck et al.; No. 4,794,409 to Cowger et al.; No. 4,509,062 to Low et al.; No. 4,929,969 to Morris; No. 4,771,295 to Baker et al.; No. 5,278,584 to Keefe et al.; and the *Hewlett-Packard Journal*, Vol. 39, No. 4 (August 1988), all of which are incorporated herein by reference. However, the claimed invention shall not be restricted to any particular ink ejectors or ink printing technologies as stated above. A wide variety of different ink delivery devices may be encompassed within the claimed invention and the term "ink ejectors" including but not limited to piezoelectric drop systems of the general type disclosed in U.S. Pat. No. 4,329,698 to Smith, dot matrix devices of the variety described in U.S. Pat. No. 4,749,291 to Kobayashi et al., as well as other comparable and functionally equivalent systems designed to deliver ink using one or more ink ejector units. The particular operating components associated with these alternative systems (e.g. the piezoelectric elements in the apparatus of U.S. Pat. No. 4,329,698) shall be encompassed within the term "ink ejectors" as previously noted. In this regard, the materials, methods, and structures of the invention are not "ink-ejector-specific".

Many different ink formulations may be used in connection with the present invention including but not limited to the embodiment of FIGS. 1–5 which employs a supply of ink 29 discussed above. Likewise, the terms "ink" and "ink composition" as used herein shall encompass dye-based materials, pigment dispersions, and liquid-toner products. The claimed invention is therefore not "ink-specific". However, it is especially suitable for use with ink materials that contain volatile components (e.g. organic solvents and water) and other ingredients which are corrosive in nature including acidic dyes and organic solvents. The term "corrosive" shall again encompass a situation in which the ink materials of interest are capable of chemically degrading various components typically encountered in conventional ink delivery systems (especially plastic parts). Corrosive agents in the ink formulations may include one or more organic solvents which are employed as ink vehicles or humectants, as well as acidic coloring agents and other compounds (depending on the ink products under consideration.) Some representative and non-limiting ink formulations will now be discussed which may be employed in the system of FIGS. 1–5 and the present invention in general.

The ink compositions will first contain at least one coloring agent. Again, this invention shall not be restricted to any particular coloring agents or mixtures thereof. While many different materials may be encompassed within the term "coloring agent" as previously noted, this discussion will focus on both colored and black dye products. Exemplary black dyes that are suitable for use in the ink compositions of interest are listed in U.S. Pat. No. 4,963,189 to Hindagolla which is incorporated herein by reference. Multiple color dye materials are described in the *Color Index*, Vol. 4, 3rd ed., published by The Society of Dyers and Colourists, Yorkshire, England (1971) which is also incorporated herein by reference and is a standard text that is well known in the art. Exemplary chemical dyes listed in the *Color Index*, supra, that are suitable for use herein include but are not limited to the following compositions: C.I. Direct Yellow 11, C.I. Direct Yellow 86, C.I. Direct Yellow 132, C.I. Direct Yellow 142, C.I. Direct Red 9, C.I. Direct Red 24, C.I. Direct Red 227, C.I. Direct Red 239, C.I. Direct Blue 9, C.I. Direct Blue 86, C.I. Direct Blue 189, C.I. Direct Blue 199, C.I. Direct Black 19, C.I. Direct Black 22, C.I. Direct Black 51, C.I. Direct Black 163, C.I. Direct Black 169, C.I. Acid Yellow 3, C.I. Acid Yellow 17, C.I. Acid Yellow 23, C.I. Acid Yellow 73, C.I. Acid Red 18, C.I. Acid Red 33, C.I. Acid Red 52, C.I. Acid Red 289, C.I. Acid Blue 9, C.I. Acid Blue 61:1, C.I. Acid Blue 72, C.I. Acid Black 1, C.I. Acid Black 2, C.I. Acid Black 194, C.I. Reactive Yellow 58, C.I. Reactive Yellow 162, C.I. Reactive Yellow 163, C.I. Reactive Red 21, C.I. Reactive Red 159, C.I. Reactive Red 180, C.I. Reactive Blue 79, C.I. Reactive Blue 216, C.I. Reactive Blue 227, C.I. Reactive Black 5, C.I. Reactive Black 31, C.I. Basic Yellow 13, C.I. Basic Yellow 60, C.I. Basic Yellow 82, C.I. Basic Blue 124, C.I. Basic Blue 140, C.I. Basic Blue 154, C.I. Basic Red 14, C.I. Basic Red 46, C.I. Basic Red 51, C.I. Basic Black 11, and mixtures thereof. These materials are commercially available from many sources including but are not limited to the Sandoz Corporation of East Hanover, N.J. (USA), Ciba-Geigy of Ardsley, N.Y. (USA), and others.

As previously noted, the term "coloring agent" shall also encompass pigment dispersions known in the art which basically involve a water-insoluble colorant (namely, a pigment) which is rendered soluble through association with a dispersant (e.g. an acrylic compound). Specific pigments which may be employed to produce pigment dispersions are known in the art, and the present invention shall not be limited to any particular chemical compositions in this regard. Examples of such pigments involve the following compounds which are listed in the *Color Index*, supra: C.I. Pigment Black 7, C.I. Pigment Blue 15, and C.I. Pigment Red 2. Dispersant materials suitable for combination with these and other pigments include monomers and polymers which are also known in the art. An exemplary commercial dispersant consists of a product sold by W.R. Grace and Co. of Lexington, Mass. (USA) under the trademark DAXAD. In a preferred embodiment, the ink compositions of interest will contain about 2–7% by weight total coloring agent therein (e.g. whether a single coloring agent or combined coloring agents are used). However, the amount of coloring agent to be employed may be varied as need, depending on the ultimate purpose for which the ink composition is intended and the other ingredients in the ink.

The ink compositions suitable for use in this invention will also include an ink "vehicle" which essentially functions as a carrier medium and main solvent for the other ink ingredients. Many different materials may be used as the ink vehicle, with the present invention not being limited to any particular products for this purpose. A preferred ink vehicle will consist of water combined with other components including organic solvents. These organic solvents include but are not limited to 2-pyrrolidone, 1,5-pentanediol, N-methyl pyrrolidone, 2-propanol, ethoxylated glycerol, 2-ethyl-2-hydroxymethyl-1,3-propanediol, cyclohexanol, and others known in the art for solvent and/or humectant purposes. Such materials are volatile and can be corrosive in character as defined above. All of these compounds may be used in various combinations as determined by preliminary pilot studies on the ink compositions of concern. However, in a preferred embodiment, the ink formulations will contain about 70–80% by weight total combined ink vehicle, wherein at least about 30% by weight of the total ink vehicle will typically consist of water (with the balance comprising any one of the above-listed organic solvents alone or combined). An exemplary ink vehicle will contain about 60–80% by weight water and about 10–30% by weight of one or more organic solvents.

The ink compositions may also include a number of optional ingredients in varying amounts. For example, an optional biocide may be added to prevent any microbial growth in the final ink product. Exemplary biocides suitable for this purpose include proprietary products sold under the trademarks PROXEL GXL by Imperial Chemical Industries of Manchester, England; UCARCID by Union Carbide of Danbury, Conn. (USA); and NUOSEPT by Huls America, Inc. of Piscataway, N.J. (USA). In a preferred embodiment, if a biocide is used, the final ink composition will typically include about 0.05–0.5% by weight biocide, with about 0.30% by weight being preferred.

Another optional ingredient to be used in the ink compositions will involve one or more buffering agents. The use of a selected buffering agent or multiple (combined) buffering agents is designed to stabilize the pH of the ink formulations if needed and desired. In a preferred embodiment, the optimum pH of the ink compositions will range from about 4–9. Exemplary buffering agents suitable for this purpose include sodium borate, boric acid, and phosphate buffering materials known in the art for pH control. The selection of any particular buffering agents and the amount of buffering agents to be used (as well as the decision to use buffering agents in general) will be determined in accordance with preliminary pilot studies on the particular ink compositions of concern. Additional ingredients (e.g. surfactants) may also be present in the ink compositions if needed.

Use of the unique bladder system claimed herein shall not be restricted to the ink compositions listed above which are provided for example purposes only. Many other ink materials may be employed including those recited in U.S. Pat. No. 5,185,034 which is incorporated herein by reference.

Figure 2:
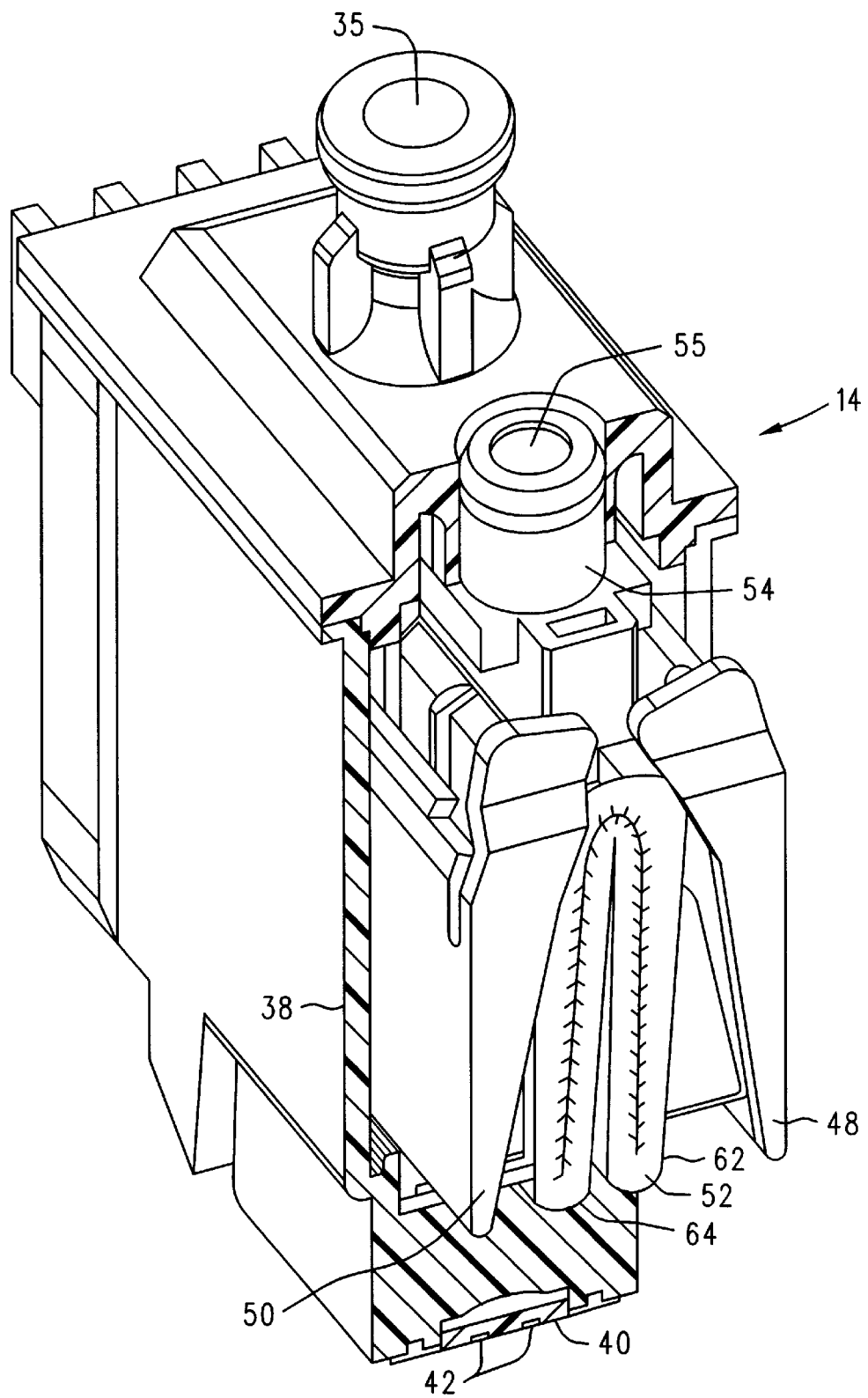
FIG. 2 is an enlarged view (partially in cross-section for background information purposes) of an ink containment vessel/accumulator and pressure control bladder system which is suitable for use in connection with the invention.

Referring now to FIGS. 2–5, a preferred back pressure regulator 37 will now be discussed. As illustrated in FIG. 2, positioned within the ink containment vessel 38 (which functions as accumulator as previously noted) is an arm-like pressure regulator lever 48, an arm-like accumulator lever 50, and a flexible, "multi-lobed" lung-like bag structure characterized herein as a pressure control bladder 52. The term "bladder" as used in describing the claimed invention shall be construed in a broad manner to again encompass a wide variety of different devices including but not limited to any flexible inflatable/deflatable structure regardless of shape, form, or material which is designed to receive one or more fluids (liquids or preferably gases) therein. The pressure regulator lever 48 and the accumulator lever 50 are each positioned on opposite sides of the bladder 52, and are urged together and against the bladder 52 by a biasing member. The biasing member will optimally have a predetermined spring constant and, in a preferred embodiment, consists of a spring 53 illustrated in FIGS. 3–5 (but omitted from FIG. 2 for the sake of clarity). In opposition to the biasing action of the spring 53, the bladder 52 spreads the two levers 48, 50 apart as it inflates outwardly during operation (discussed below).

Figure 3:
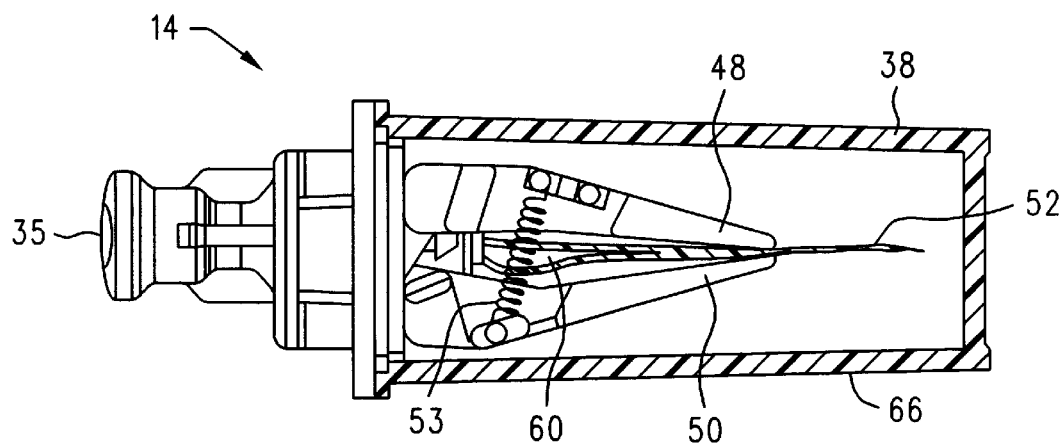
FIGS. 3–5 are side elevational views partially in cross-section which schematically illustrate the operation of the pressure control bladder system.
Figure 4:
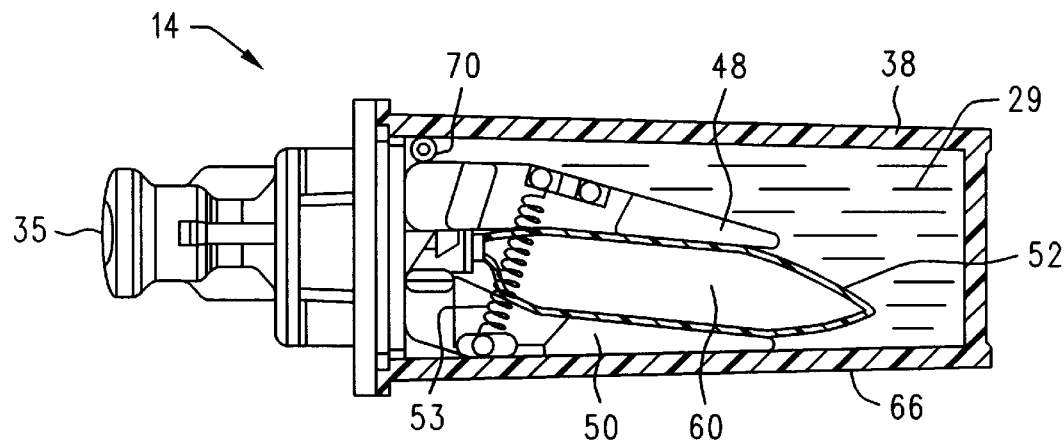
Figure 5:
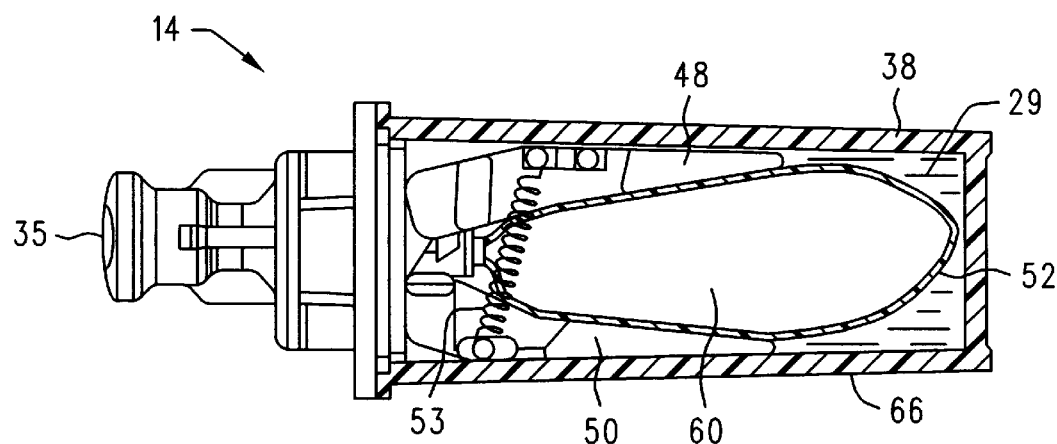

The bladder 52 is mounted using conventional heat sealing processes to a fitment 54 that is schematically shown in FIG. 2. The fitment 54 contains a vent 55 which preferably consists of a conventional vent screw (not shown) in the shape of a helical labyrinth. The vent 55 communicates with ambient air as discussed below. In addition, the vent 55 connects to and is in fluid communication with the interior region 60 of the bladder 52 (FIGS. 3–5.) As a result, the bladder 52 is maintained at a reference pressure which, in a preferred embodiment, will involve ambient atmospheric pressure. The preferred helical path of the vent 55 limits the diffusion of accumulated water and ink vapors out of the bladder 52.

Both the pressure regulator lever 48 and the accumulator lever 50 are attached to and within the ink containment vessel/accumulator 38 in a pivotally rotatable manner. In response to expansion and contraction of the bladder 52 as it controls back pressure, the pressure regulator lever 48 rotates toward and/or against the bladder 52 in order to open and close a valve (not shown) which is operatively connected to the incoming supply of ink 29. Further information regarding this valve and the manner in which it operates is discussed in co-owned U.S. Pat. No. 5,975,686 as noted above (incorporated herein by reference and relied upon for priority). Thus, rotational motion of the accumulator lever 48 (FIGS. 2–5) controls the flow of ink 29 into the ink containment vessel/accumulator 38. Incidentally, regarding FIGS. 3–5, it shall be noted that such figures are schematic in nature and have omitted any illustration of the printhead 40 for the sake of clarity. The position of the printhead 40, however, is clearly illustrated in FIG. 2 which may be relied on for this purpose.

The accumulator lever 50 as shown in FIGS. 2–5 also operates in a cooperative manner with the bladder 52 to accommodate changes in volume due to any air (defined above) that may be trapped within the ink containment vessel 14. The accumulator lever 50 likewise compensates for any other pressure changes in the pen 14. In particular, the accumulator lever 50 functions in a manner which modulates any fluctuations in back pressure levels. During operation, the spring-biased accumulator lever 50 exerts compressive force on the bladder 52 (the inside of which is optimally at ambient pressure), forces air out of the bladder 52, and allows any air (or other gases) trapped within the ink containment vessel/accumulator 38 to expand.

In general, the bladder 52 expands and contracts as a function of the differential between the back pressure in the ink containment vessel 38 and ambient pressure communicated through the vent 55 in the fitment 54. Operation of the bladder 52, pressure regulator lever 48, and accumulator lever 50 are illustrated in greater detail in FIGS. 3–5. It should be noted that the bladder 52 in FIGS. 3–5 is drawn in a more "bag-like" configuration compared with the bladder 52 illustrated in FIG. 2 for the sake of convenience and clarity. The bladder 52 of FIG. 2 specifically includes dual "lobes" 62, 64 which create a "lung-like" structure in a representative and non-limiting embodiment.

With reference to FIG. 3, the initial operational stages of the ink delivery system are shown in which none of the ink 29 is present inside the ink containment vessel/accumulator 38. The bladder 52 is therefore in a "limp" and deflated condition. As a result, the back pressure in the ink containment vessel 38 equals ambient pressure. The biasing member (namely, the spring 53) urges the two levers 48, 50 together with the bladder 52 therebetween as illustrated.

Next, the needle 34 shown schematically in FIG. 1 is inserted into the septum 35 and a vacuum is drawn on the nozzles (not shown) in the printhead 40 in order to withdraw the ink 29 from the reservoir unit 28 into the pen 14 (specifically, into ink containment vessel/accumulator 38.) In response to this vacuum, the accumulator lever 50 moves first, and the bladder 52 begins to expand as shown in FIG. 4. The accumulator lever 50 will continue to rotate outwardly until it engages the side wall 66 of the ink containment vessel 38. At this point, the pressure regulator lever 48 begins to move, and the ink 29 is allowed to enter the ink containment vessel/accumulator 38 through the valve discussed above (not shown). The pressure regulator lever 48 will continue to rotate outwardly until it likewise engages the side wall 66 of the ink containment vessel 38 as indicated in FIG. 5 (although it is likely that back pressure feedback will prevent complete engagement between the pressure regulator lever 48 and the side wall 66). During system operation, the pressure regulator lever 48 will be moved between the positions shown in FIGS. 4–5, with the exact location of the lever 48 at any given time depending on the speed of printing and the rate at which the ink 29 is depleted from the ink containment vessel 38 by the printhead 40.

Once the ink containment vessel/accumulator 38 is filled with ink 29 or if printing has stopped, the pressure regulator lever 48 will slowly rotate and close the ink delivery valve associated therewith in accordance with the biasing action of the spring 53. Each of the levers 48, 50 will then return to the positions illustrated in FIG. 4, with this figure representing the normal or "steady state" condition of the pen 14.

With continued reference to FIG. 4, an air bubble 70 is shown which has inadvertently entered the ink containment vessel/accumulator 38. If the pen 14 is subjected to elevated temperatures or increased altitude, the bubble 70 will expand. Expansion of the air bubble 70 will be compensated for by contraction of the bladder 52 due to a pressure change caused by a corresponding increase in the volume of the bubble 70. As a result, the accumulator lever 50 moves from the location shown in FIG. 4 toward the position illustrated in FIG. 3. In addition, the pressure regulator lever 48 will also move (to a minor degree) in view of the resilient character of the valve (not shown) associated therewith. Conversely, if the air bubble 70 contracts, the bladder 52 will expand in response to this condition, thereby causing the pressure regulator lever 48 to open the ink flow valve and admit ink 29 into the ink containment vessel 38. It can therefore be stated that any expansion or contraction of the air bubble 70 within the ink containment vessel 38 will cause the bladder 52 to compensate in reverse by, for example, contracting in response to expansion of the bubble 70 and vice versa. Finally, when the ink reservoir unit 28 is depleted of ink 29, the levers 48, 50 will rotate to the "full open" position of FIG. 5 and the printhead 40 stops ejecting ink.

It is again important to emphasize that the description provided above is of an abbreviated nature, with more detailed information being presented in U.S. Pat. No. 5,975,686. In addition, the claimed invention (which involves a novel bladder design) shall not be limited to the system discussed above and shown in FIGS. 1–5. Other bladder-type devices are also applicable including but not limited to those discussed in the following U.S. Patents which are incorporated herein by reference: Nos. 5,153,612; 5,280,300; and 5,583,545. U.S. Pat. Nos. 5,280,300 and 5,153,612 involve bladder-type structures which are used to hold ink materials therein and are also applicable to the claimed invention.

B. The Novel Bladder Structures

As indicated above, the present invention involves an improved bladder structure produced from highly specialized materials that provide numerous benefits including but not limited to improved longevity, greater structural integrity, and the ability to prevent ink materials and various gases (e.g. air, volatilized ink components, and the like) from passing through the bladder wall.

U.S. Pat. No. 5,975,686 discloses a number of previously-used materials in connection with the side wall of the bladder 52. These materials include (in various combinations and layer configurations) the following compositions: ethylene chlorotrifluoroethylene copolymer, polyvinylidene fluoride, ethylene vinyl alcohol copolymer, polyvinylidene chloride, polychlorotrifluoroethylene, polyethylene (low, medium, or high-density), various elemental metals (e.g. aluminum), aluminum oxide, silicon dioxide, one or more liquid crystal polymers, and diamond-like carbon. Conventional lamination or co-extrusion techniques were employed to produce the film-type products discussed above, with the various layers being secured together using one or more adhesive materials or polymeric "tie" layers. An exemplary and preferred tie composition suitable for this purpose includes ethylene vinyl acetate and the like.

Notwithstanding the side wall construction materials listed above, it has been discovered that a special composition can be employed within the side wall of the bladder 52 (and any other bladder structures encompassed within the invention) to provide many important benefits. Bladder units produced from the novel materials summarized in this section are characterized by an improved degree of longevity. Likewise, air (as defined above) and ink components are prevented from passing through the side wall of the bladder. As a result, the operating efficiency of the entire ink delivery system is improved with a significant reduction in operational down-time. This special material and its unexpectedly superior capabilities will now be discussed in detail. It should be noted that, in the figures which accompany the following discussion, the illustrated side wall structures are not necessarily drawn to scale, with one or more portions thereof being enlarged for the sake of clarity.

Figure 6:
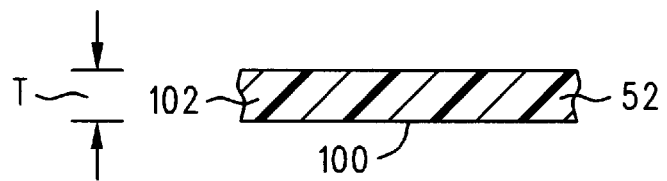
FIG. 6 is a cross-sectional view showing a portion of the side wall used to construct a representative bladder unit in a preferred embodiment of the invention.

With reference to FIG. 6, a partial, enlarged cross-section view of a flexible film-type side wall 100 associated with the bladder 52 (or any other bladder member encompassed within this invention) is illustrated. In the preferred embodiment of FIG. 6, the side wall 100 involves a single layer 102 comprised of a material designated herein as "polyethylene naphthalate" (e.g. "PEN") which is also known as a homopolymer of dimethyl 2,6-naphthalenedicarboxylate and ethylene glycol. It specifically has the following chemical structure:

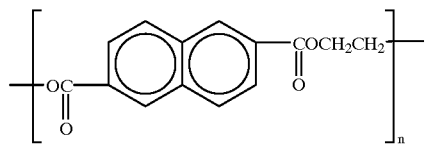

In a non-limiting preferred embodiment, n=about 10–1000 in the above-listed structure.

Regarding the chemical characteristics of this material, they involve a tensile strength of 32,000 lbs./sq. in. and a tensile modulus of 750,000 lbs./sq. in. These parameters were determined according to a standardized procedure referenced in ASTM D-882-88. The water vapor transmission rate of polyethylene naphthalate has been reported in the vicinity of 3.6 gm/m$^2$/day. Polyethylene naphthalate also has a glass transition temperature ($T_g$) of approximately 120° C. and a melting temperature of 262° C. Compared to, for example, polyethylene terephthalate ("PETE"), polyethylene naphthalate has a 43° C. higher glass transition temperature, a 50% higher tensile modulus, a 33% higher tensile strength, a five-fold improvement in its ability to function as a gas barrier (as measured in accordance with biaxially-oriented films), a three-fold improvement in hydrolysis resistance, a four-fold enhancement in moisture barrier capacity, and greater chemical resistance. In this regard, polyethylene naphthalate is highly beneficial when used to manufacture the side wall of an ink containment vessel in accordance with its considerable degree of chemical resistance to the corrosive effects of ink materials, the ability to withstand relatively high temperatures which are traditionally encountered during the manufacturing processes associated with ink containment vessel fabrication, low moisture absorption, low water vapor transmission, a high retention of tensile strength even after being exposed to hydrolysis conditions, a high continuous use temperature in an electrical environment, and the ability to be formed into many shapes in a rapid and effective manner using conventional injection molding techniques. Polyethylene naphthalate provides all of these benefits yet is economical from a material cost standpoint. Thus, the use of polyethylene naphthalate for the purposes specified herein offers many advantages and represents a significant technical advance in the art of ink containment vessel fabrication.

While polyethylene naphthalate may be obtained from a number of different sources, it is commercially available from, for example, Imperial Chemical Industries ("ICI") of Wilmington, Del. (USA) under the trademark "KALADEX" and from Amoco Polymers, Inc. of Alpharetta, Ga. (USA).

The phrase "comprised of polyethylene naphthalate" (which is the chemical composition of primary interest in this case) shall be construed to encompass any type of side wall structure provided that it has at least some polyethylene naphthalate therein. Exemplary side wall structures incorporated within this definition include but are not limited to (1) single-component (e.g. mono-layer) side walls made in whole or in part of polyethylene naphthalate; and (2) composite side walls made from multiple material layers in which at least one of the layers contains in whole or in part polyethylene naphthalate. In this regard, the present invention shall not be restricted to any particular side wall configuration provided that it includes at least some polyethylene naphthalate as a primary active component designed to impart improved ink resistance, durability, structural integrity, and the like. Accordingly, the use of polyethylene naphthalate to generally form the side wall of a flexible bladder unit (particularly in thermal inkjet systems) offers many advantages and therefore constitutes a substantial advance in the art of ink delivery technology.

At this point, it should be emphasized that the present invention and its various embodiments shall not be restricted to any particular compositions, materials, proportions, amounts, bladder uses, and other parameters unless otherwise stated herein. All numerical values and ranges presented in this discussion are provided for example purposes only and represent preferred versions of the invention designed to achieve maximum operational efficiency. Regarding the overall thickness of the side wall 100 made from polyethylene naphthalate in this embodiment, it is preferred that a uniform thickness "T" of about 0.25–3.0 mil (typical=about 1.0 mil) be employed. This range is subject to variation as needed based on routine preliminary testing. Also, many different construction methods can be employed to produce the claimed bladder structures from polyethylene naphthalate including conventional extrusion, molding, thermal welding, or laminating techniques known in the art for this purpose as outlined in greater detail below. Likewise, the construction techniques generally discussed in co-owned and co-pending U.S. patent application No. 08/869,446 (filed on Jun. 5, 1997) which is incorporated herein by reference may also be used to manufacture the bladder units described herein.

As noted above, the side wall 100 of the bladder 52 in the embodiment of FIG. 6 is constructed in whole or in part from polyethylene naphthalate. The side wall 100 of FIG. 6 may therefore be produced entirely of polyethylene naphthalate (in film or other forms) or a "blend" of polyethylene naphthalate and one or more other materials. These "blends" can be manufactured using conventional co-extrusion methods and other related techniques. This alternative embodiment shall not be restricted to any particular materials combined with the polyethylene naphthalate, with these supplemental ingredients also being characterized as "additional reinforcement compositions". In a preferred embodiment, one or more organic polymers (defined above) will be employed as the additional reinforcement composition(s) with a non-exhaustive list of exemplary materials suitable for this purpose being as follows: polyvinylidene chloride, polyvinylidene fluoride, ethylene vinyl alcohol copolymer, polyethylene (high, low, or medium density), ethylene chlorotrifluoroethylene copolymer, polychlorotrifluoroethylene, at least one liquid crystal polymer, and mixtures thereof. The term "liquid crystal polymer" shall be defined herein to involve a class of thermoplastic polymers that exhibit a highly ordered structure in both the melt and solid states and incorporate an aromatic backbone. In particular, liquid crystal polymers are made up entirely of aromatic monomers. The aromatic character of liquid crystal polymers as a general class contributes to the beneficial ink-resistant characteristics thereof, excellent mechanical properties, and a high degree of thermal/thermooxidative stability. The ordered character of liquid crystal polymers is likewise another distinguishing feature of these materials relative to other polymeric compounds. Accordingly, liquid crystal polymers are readily molded or fabricated more effectively in a wide variety of configurations using standard production methods. The term "aromatic" as used in this discussion shall encompass materials which contain one or more benzene ring units therein. In addition, from a structural standpoint as discussed in the *Encyclopedia of Polymer Science and Engineering* (Kroschwitz, J. ed.), Vol. 9 (entitled "Liquid Crystal Polymers to Mining applications), John Wiley & Sons, Inc., New York (1987), pp. 1–8 (incorporated herein by reference), liquid crystal polymers shall further be defined to involve a "succession of para-oriented ring structures to give a stiff chain with a high axial ratio (ratio of length of molecule to its width, aspect ratio) x." As further stated in this reference, "The common structural feature of low molecular weight LC compounds is asymmetry of molecular shape, manifested either as rods characterized by a uniaxial order with an axial ratio usually greater than three or by thin platelets with biaxial order."

This embodiment of the invention shall not be restricted to any particular liquid crystal polymers or combinations thereof. Either one liquid crystal polymer or multiple liquid crystal polymers may be used in combination without limitation. Exemplary and non-limiting examples of liquid crystal polymers which can be employed in producing the side wall 100 of the bladder 52 (or the side walls of other bladder structures associated with the additional embodiments set forth below) shall involve the following commercially-available liquid crystal polymer materials:

1. A product sold under the name/trademark "Vectra" by the Hoechst Co. of Summit, N.J. (USA). From a chemical standpoint, this proprietary composition essentially consists of a wholly aromatic polyester/polyamide made from aromatic diacids, aromatic dialcohols, and aromatic moieties with two different substituents, with the substituents involving alcohols, acids, or amines. In particular, the "Vectra" line of liquid crystal polymers involves several compositions including but not limited to: (A) p-hydroxybenzoic acid modified with 2-oxynaphthalene-6-carbonyl units; or (B) 2,6-dioxynaphthalene modified with terephthaloyl units.

2. A product sold under the name/trademark "Xydar" by Amoco Polymers, Inc. of Alpharetta, Ga. (USA). Chemically, this composition basically consists of a product of the modification of p-hydrobenzoic acid with 4,4'-biphenol and terephthalic acid.

3. A product sold under the name/trademark "Zenite" by E. I. DuPont de Nemours & Company of Wilmington, Del. (USA).

Other liquid crystal polymers which may be employed include but are not limited to the following materials: aromatic polyamides, aromatic polyoxamides, aromatic polyhydrazides, aromatic poly(oxalic hydrazides), aromatic poly(amine hydrazides), poly(p-phenylenebenzobisthiazole), and polyimides. In order to produce the layer 102, various other compositions (preferably organic in character) may likewise be combined with polyethylene naphthalate in addition to or instead of those listed above as determined by routine preliminary testing.

This embodiment shall also not be restricted to any particular material quantities in connection with polyethylene naphthalate "blends", with the use of polyethylene naphthalate generally providing improved results over a wide concentration range. However, it is preferred that any polyethylene naphthalate "blend" that is used to manufacture the layer 102 in the side wall 100 of the bladder 52 in the present embodiment (or any other embodiments described herein which employ at least one polyethylene naphthalate-containing layer) contain at least about 50% or more by weight polyethylene naphthalate. Nonetheless, optimum results are achieved in the embodiment of FIG. 6 if the layer 102 consists entirely of polyethylene naphthalate.

As previously noted, the present invention shall also encompass a side wall structure which incorporates a plurality of material layers which are laminated or otherwise secured together to form a single structural unit which effectively prevents air and volatile ink components from passing therethrough. The plurality of material layers (in its broadest sense) includes (1) at least one layer constructed in whole or in part from polyethylene naphthalate, with the information provided above regarding layer 102 in the previous embodiment being applicable to and incorporated by reference in this embodiment; and (2) at least one layer of an additional reinforcement composition which is designed to augment the beneficial characteristics of the polyethylene naphthalate-containing layer. Of primary importance in this multi-layer system is the layer which contains polyethylene naphthalate. The polyethylene naphthalate again contributes to the unique characteristics of the completed bladder 52 including its corrosion resistance, greater overall longevity, and impermeability to ink materials.

In a multi-layer bladder side wall, the claimed invention shall not be limited to any number, order, or arrangement of material layers. A wide variety of different layering arrangements and compositions will work effectively for the purposes outlined above provided that the completed side wall includes at least one layer containing in whole or in part polyethylene naphthalate.

Figure 7:
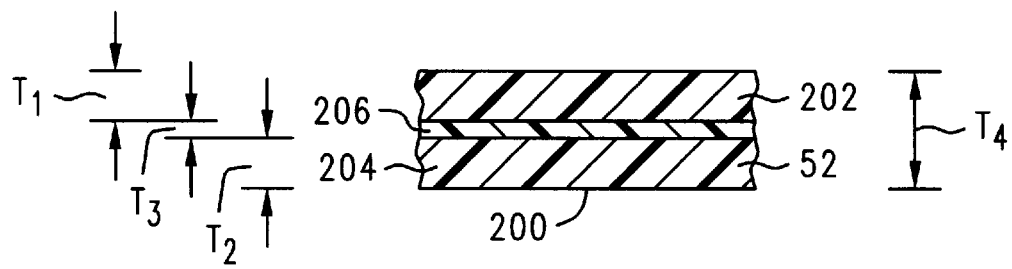
FIG. 7 is a cross-sectional view showing a portion of the side wall used to construct a representative bladder unit in an alternative embodiment.

With reference to FIG. 7, an alternative side wall 200 of the bladder 52 (or any other bladder encompassed within the claimed invention) is illustrated. In this embodiment, the side wall 200 consists of a composite structure containing a first layer 202 of flexible material, a second layer 204 of flexible material, and a flexible intermediate "tie" layer 206 positioned between the first and second layers 202, 204 which is designed to bond them together in a cohesive and secure manner. The first layer 202 in the embodiment of FIG. 7 will contain in whole or in part polyethylene naphthalate and, from a chemical content standpoint, will be substantially identical to the polyethylene naphthalate-containing layer 102 in the embodiment of FIG. 6. Thus, all of the information provided above regarding layer 102 in FIG. 6 (including data involving polyethylene naphthalate "blends") is equally applicable to and incorporated by reference relative to the first layer 202 in the embodiment of FIG. 7.

Regarding the second layer 204, this layer will consist of at least one material again designated herein as an "additional reinforcement composition". This composition (and the second layer 204 in general) is designed to augment the beneficial structural features of the first layer 202 containing in whole or in part polyethylene naphthalate. Many different compounds can be employed as the additional reinforcement composition in the second layer 204 without limitation provided that they have the common ability to augment the ink and air-resistant capabilities of the polyethylene naphthalate-containing first layer 202. While this embodiment shall not be restricted to any particular additional reinforcement compositions for use in producing the second layer 204, exemplary and preferred materials which are suitable for this purpose include but are not limited to polyvinylidene chloride, polyvinylidene fluoride, ethylene vinyl alcohol copolymer, polyethylene, ethylene chlorotrifluoroethylene copolymer, polychlorotrifluoroethylene, at least one liquid crystal polymer, at least one elemental metal (e.g. aluminum, tantalum, silver, gold and copper), aluminum oxide, silicon dioxide, diamond-like carbon, and mixtures thereof. Within this group, the term "liquid crystal polymer" is generally defined above, with specific examples of liquid crystal polymers that may be used in the second layer 204 including the particular compositions listed above in connection with the embodiment of FIG. 6 (with such information being incorporated by reference in the present discussion regarding FIG. 7).

Finally, tie layer 206 which is used to bind the first and second layers 202, 204 together may be applied during production to the first layer 202, the second layer 204, or both layers 202, 204 simultaneously to yield the completed side wall 200. This embodiment of the invention (and the other embodiments described below) shall not be restricted to any particular chemical compositions in connection with the various tie layers that are employed (including tie layer 206 shown in FIG. 7). However, exemplary materials which are suitable for use as the tie layer(s) in the present invention include but are not limited to known polyurethane, epoxy, polyester, and polyacrylic-based adhesives which are commercially-available from numerous sources including Bostic of Middletown, Mass. (USA) and the Liofol Company of Cary, N.C. (USA). In addition, other polymeric compounds having material-bonding properties including ethylene vinyl acetate, polyethylenes, epoxy resins, vinyl ester resins, and mixtures thereof may also be employed for this purpose.

As indicated above in connection with the embodiment of FIG. 6, the side wall 200 of FIG. 7 shall not be restricted to any particular thickness values. The thickness of each layer 202, 204, 206 may be varied as needed in accordance with routine preliminary testing taking into account the environment in which the ink delivery system is going to be used, the specific inks being delivered, and other related factors. However, in a non-limiting representative configuration, the first layer 202 which contains in whole or in part polyethylene naphthalate will have a representative thickness "$T_1$" of about 0.25–3.0 mil (typical=about 1.0 mil). The second layer 204 made from at least one additional reinforcement composition (defined above) will have an exemplary thickness "$T_2$" of about 0.25–3.0 mil (typical=about 1.0 mil). Finally, the intermediate tie layer 206 will have a representative thickness "$T_3$" of about 0.10–1.0 mil (typical=about 0.5 mil), with this and the other thickness values listed above being subject to change as previously noted. As a result of these thickness parameters, the completed side wall 200 will have an overall thickness "$T_4$" in a preferred embodiment of about 0.60–7.0 mil (typical=about 2.5 mil). The resulting side wall 200 is strong, resilient, and able to effectively prevent the passage therethrough of gases (e.g. air) and ink materials in an unexpectedly superior manner compared with structures which lack any polyethylene naphthalate.

Finally, as shown in the embodiment of FIG. 7, the first layer 202 constitutes an "upper" layer in the completed side wall 200 which functions as the outermost material that comes in direct contact with the ink inside the ink containment vessel. The second layer 204 functions as the "lower"

layer in the side wall 200 which is positioned inside the bladder 52 adjacent the interior region 60 (FIGS. 3–5). However, in the alternative, it may also be possible to reverse this orientation so that the first layer 202 constitutes the "lower" layer in the side wall 200, with the second layer 204 functioning as the "upper" layer. As a default configuration, the first orientation described above is preferred in accordance with the high degree of ink resistance provided by the polyethylene naphthalate-containing first layer 202. Nonetheless, either option will provide beneficial results compared with non-polyethylene naphthalate-containing structures, with the selection of either option being determined by preliminary pilot testing.

Figure 8:
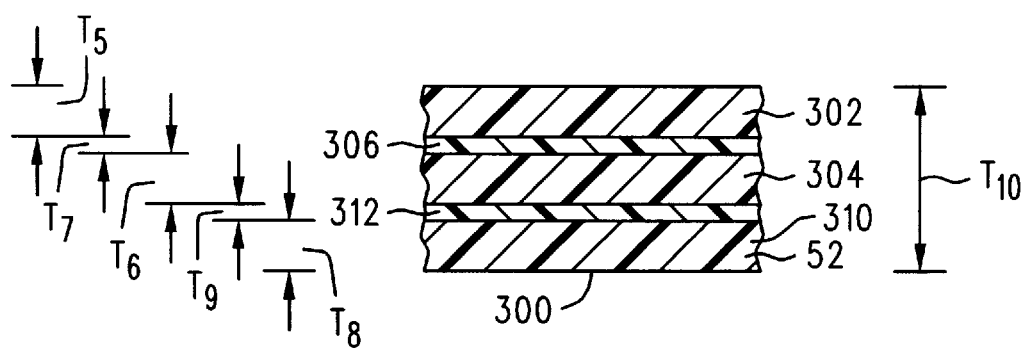
FIG. 8 is a cross-sectional view showing a portion of the side wall used to construct a representative bladder unit in a further alternative embodiment.

In a further alternative embodiment illustrated in FIG. 8, another bladder side wall structure is provided which offers the benefits listed above including improved durability, longevity, and ink/air resistance. This side wall structure is shown at reference number 300 in FIG. 8 and involves three separate layers secured together. In the embodiment of FIG. 8, the side wall 300 consists of a composite structure containing a first layer 302 of flexible material, a second layer 304 of flexible material, and a flexible primary "tie" layer 306 positioned between the first and second layers 302, 304 which is designed to bond them together in a cohesive and secure manner. Also included is a third layer 310 of flexible material and a flexible secondary "tie" layer 312 positioned between the second and third layers 304, 310 which likewise bonds the layers 304, 310 together in a cohesive and secure manner.

The first layer 302 in the embodiment of FIG. 8 will contain in whole or in part polyethylene naphthalate and, from a chemical content standpoint, will be substantially identical to the polyethylene naphthalate-containing layer 102 used in the embodiment of FIG. 6. Thus, all of the information provided above regarding layer 102 in FIG. 6 (including data involving polyethylene naphthalate "blends") is equally applicable to and incorporated by reference relative to the first layer 302 in the embodiment of FIG. 8.

Regarding the second layer 304, this layer will consist of at least one material again designated herein as an "additional reinforcement composition". This composition (and the second layer 304 in general) is designed to augment the beneficial structural features of the first layer 302 containing in whole or in part polyethylene naphthalate. The second layer 304 shown in FIG. 8 will be substantially identical from a chemical content standpoint to the second layer 204 used in the embodiment of FIG. 7. Thus, all of the information provided above regarding layer 204 in FIG. 7 (including representative construction materials) is equally applicable to and incorporated by reference relative to the second layer 304 in the embodiment of FIG. 8.

The primary tie layer 306 which is used to bind the first and second layers 302, 304 together may be applied during production to the first layer 302, the second layer 304, or both layers 302, 304 simultaneously. The primary tie layer 306 shown in FIG. 8 will be substantially identical from a chemical content standpoint to the tie layer 206 used in the embodiment of FIG. 7. Thus, all of the information provided above regarding tie layer 206 in FIG. 7 (including representative construction materials) is equally applicable to and incorporated by reference relative to the primary tie layer 306 illustrated in FIG. 8.

With continued reference to FIG. 8, the third layer 310 may involve two different forms. In the first form, the third layer 310 will be made entirely or partially of polyethylene naphthalate so that the third layer 310 is substantially identical from a chemical content standpoint to the first layer 302. Thus, all of the information provided above regarding the first layer 302 is equally applicable to and incorporated by reference relative to the third layer 310. The resulting structure associated with this version of the side wall 300 involves a highly-effective "sandwich" type arrangement in which two outer layers 302, 310 of polyethylene naphthalate are separated by a middle layer 304 of at least one additional reinforcement composition (defined above).

In the second form of the side wall 300, the third layer 310 will be made from at least one additional reinforcement composition so that the third layer 310 is substantially identical to the second layer 304. Thus, all of the information provided above regarding the second layer 304 (including representative construction materials) is equally applicable to and incorporated by reference relative to the third layer 310. However, the specific additional reinforcement composition(s) used in the second layer 304 may differ from the additional reinforcement composition(s) employed in the third layer 310 as determined by routine preliminary testing.

The secondary tie layer 312 which is used to bond the second and third layers 304, 310 together may be applied during production to the second layer 304, the third layer 310, or both layers 304, 310 simultaneously. From a chemical content standpoint, the secondary tie layer 312 will be substantially identical to the primary tie layer 306 regardless of the particular type of third layer 310 that is used. Thus, all of the information provided above regarding the primary tie layer 306 (including representative construction materials) is equally applicable to and incorporated by reference relative to the secondary tie layer 312. However, the specific construction materials employed in the primary tie layer 306 may differ from the compositions used in the secondary tie layer 312 as determined by routine preliminary testing.

As indicated above in connection with the embodiment of FIG. 7, the side wall 300 of FIG. 8 shall not be restricted to any particular thickness values. The thickness of each layer 302, 304, 306, 310, 312 may be varied as needed in accordance with preliminary pilot testing taking into account the environment in which the ink delivery system is going to be used, the specific inks being delivered, and other related factors. However, in a representative embodiment, the following exemplary thickness ranges are provided: (1) the thickness "$T_5$" of the first layer 302=about 0.25–3.0 mil (typical=about 1.0 mil); (2) the thickness "$T_6$" of the second layer 304=about 0.25–3.0 mil (typical=about 1.0 mil); (3) the thickness "$T_7$" of the primary tie layer 306=about 0.10–1.0 mil (typical=about 0.5 mil); (4) the thickness "$T_8$" of the third layer 310=about 0.25–3.0 mil (typical=about 1.0 mil); and (5) the thickness "$T_9$" of the secondary tie layer 312=about 0.10–1.0 mil (typical=about 0.5 mil). Taking into account the values listed above, the total thickness "$T_{10}$" of the side wall 300 in the embodiment of FIG. 8=about 0.95–11.0 mil (typical=about 4.0 mil). Again, these ranges are representative only and may be changed as needed.

With continued reference to the embodiment of FIG. 8, the first layer 302 constitutes an "upper" layer in the completed side wall 300 which functions as the outermost material that comes in direct contact with the ink inside the ink containment vessel. The third layer 310 functions as the "lower" layer of the side wall 300 which is positioned inside the bladder 52 adjacent the interior region 60 (FIGS. 3–5). However, in the alternative, it may also be possible to reverse this orientation so that the first layer 302 constitutes the "lower" layer in the side wall 300, with the third layer 310 functioning as the "upper" layer. As a default configuration, the first orientation described above is preferred when the first layer 302 contains polyethylene naphthalate and the third layer 310 is made from an additional reinforcement composition. This configuration is optimal in accordance with the high degree of ink resistance provided by the polyethylene naphthalate-containing first layer 302. Nonetheless, either option will provide beneficial results compared with non-polyethylene naphthalate-containing structures. When both the first and third layers 302, 310 are produced from polyethylene naphthalate, either orientation will likewise provide substantially equivalent results.

Figure 9:
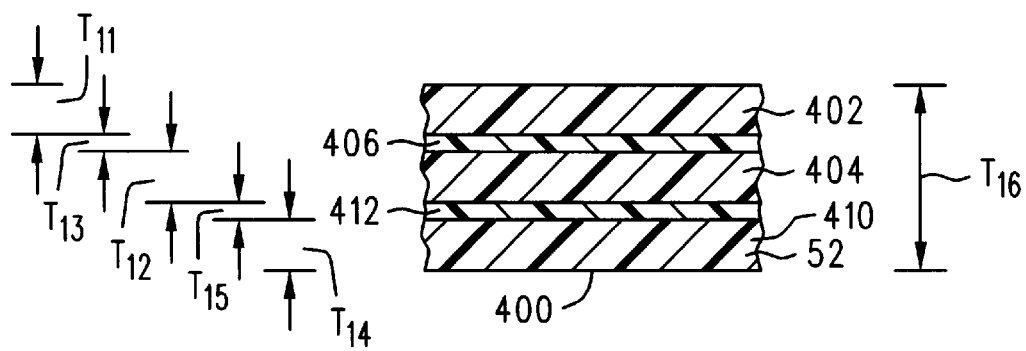
FIG. 9 is a cross-sectional view showing a portion of the side wall used to construct a representative bladder unit in a still further alternative embodiment.

In a still further alternative embodiment illustrated in FIG. 9, another bladder side wall design is provided which offers the benefits listed above including improved durability, longevity, and ink/air resistance. This side wall structure is shown at reference number 400 in FIG. 9 and likewise involves three separate layers secured together. Side wall 400 includes a first layer 402 of flexible material, a second layer 404 of flexible material, and a flexible primary "tie" layer 406 positioned between the first and second layers 402, 404. The primary tie layer 406 is designed to bond layers 402, 404 together in a cohesive and secure manner. Also included is a third layer 410 of flexible material and a flexible secondary "tie" layer 412 positioned between the second and third layers 404, 410 which is likewise designed to bond them together in a cohesive and secure manner.

Regarding the first layer 402, this layer will consist of at least one material again designated herein as an "additional reinforcement composition". This composition (and the first layer 402 in general) is designed to augment the beneficial structural features of the medial layer discussed below which is made from polyethylene naphthalate. The first layer 402 shown in FIG. 9 will be substantially identical from a chemical content standpoint to the second layer 204 used in the embodiment of FIG. 7. Thus, all of the information provided above regarding layer 204 in FIG. 7 (including representative construction materials) is equally applicable to and incorporated by reference relative to the first layer 402 in the embodiment of FIG. 9.

The second layer 404 will contain in whole or in part polyethylene naphthalate and, from a chemical content standpoint, will be substantially identical to the polyethylene naphthalate-containing layer 102 used in the embodiment of FIG. 6. Thus, all of the information provided above regarding layer 102 in FIG. 6 (including data involving polyethylene naphthalate "blends") is equally applicable to and incorporated by reference relative to the second layer 404 in the embodiment of FIG. 9.

The primary tie layer 406 which is used to bind the first and second layers 402, 404 together may be applied during production to the first layer 402, the second layer 404, or both layers 402, 404 simultaneously. The primary tie layer 406 shown in FIG. 9 will be substantially identical from a chemical content standpoint to the tie layer 206 used in the embodiment of FIG. 7. Thus, all of the information provided above regarding tie layer 206 in FIG. 7 (including representative construction materials) is equally applicable to and incorporated by reference relative to the primary tie layer 406 illustrated in FIG. 9.

Next, with continued reference to FIG. 9, the third layer 410 will also be made from at least one additional reinforcement composition so that the third layer 410 is substantially identical to the first layer 402 from a chemical content standpoint. Thus, all of the information provided above regarding the first layer 402 (including representative construction materials) is equally applicable to and incorporated by reference relative to the third layer 410. However, the specific additional reinforcement composition(s) used in the first layer 402 may differ from the additional reinforcement composition(s) employed in the third layer 410 as determined by routine preliminary testing.

Finally, the secondary tie layer 412 which is used to bind the second and third layers 404, 410 together may be applied during production to the second layer 404, the third layer 410, or both layers 404, 410 simultaneously. The secondary tie layer 412 shown in FIG. 9 will be substantially identical from a chemical content standpoint to the primary tie layer 406. Thus, all of the information provided above regarding the primary tie layer 406 (including representative construction materials) is equally applicable to and incorporated by reference relative to the secondary tie layer 410 illustrated in FIG. 9. However, the specific construction materials employed in the primary tie layer 406 may differ from the compositions used in the secondary tie layer 412. The resulting structure associated with the side wall 400 involves a "sandwich" type arrangement in which two outer layers 402, 410 of one or more additional reinforcement compositions are separated by a middle layer 404 made partially or entirely of polyethylene naphthalate.

As indicated above in connection with the embodiment of FIG. 8, the side wall 400 of FIG. 9 shall not be restricted to any particular thickness values. The thickness of each layer 402, 404, 406, 410, 412 may be varied as needed in accordance with routine preliminary testing taking into account the environment in which the ink delivery system is going to be used, the specific inks being delivered, and other related factors. However, in a representative embodiment, the following exemplary thickness ranges are provided: (1) the thickness "$T_{11}$" of first layer 402=about 0.25–3.0 mil (typical=about 1.0 mil); (2) the thickness "$T_{2}$" of the second layer 404=about 0.25–3.0 mil (typical=about 1.0 mil); (3) the thickness "$T_{13}$" of the primary tie layer 406=about 0.10–1.0 mil (typical=about 0.5 mil); (4) the thickness "$T_{14}$" of the third layer 410=about 0.25–3.0 mil (typical=about 1.0 mil); and (5) the thickness "$T_{15}$" of the secondary tie layer 412=about 0.10–1.0 mil (typical=about 0.5 mil). Again, these values are representative only and may be changed as needed. As a result of these thickness parameters, the completed side wall 400 will have an overall thickness "T,6" in a preferred embodiment of about 0.95–11.0 mil (typical= about 4.0 mil).

With continued reference to the embodiment of FIG. 9, the first layer 402 constitutes an "upper" layer in the completed side wall 400 which functions as the outermost material that comes in direct contact with the ink inside the ink containment vessel. The third layer 410 functions as the "lower" layer of the side wall 400 which is positioned inside the bladder 52 adjacent the interior region 60 (FIGS. 3–5). This arrangement may be reversed with equivalent results since both the first and third layers 402, 410 are produced from substantially the same materials, namely, at least one additional reinforcement composition as previously noted. In either orientation, the second layer 404 made entirely or partially of polyethylene naphthalate shall be considered the "medial" layer in the side wall 400.

As a final note regarding the side wall 400, a representative and preferred embodiment which provides excellent results will involve a configuration in which the additional reinforcement composition associated with the first and third layers 402, 410 (e.g. the "upper" and "lower" layers, respectively) will consist of low, medium, or high density polyethylene, with the second or "medial" layer 404 being produced from polyethylene naphthalate. Representative thickness values for these layers will be the same as those provided above in the general discussion of side wall 400.

As previously stated, the present invention shall not be restricted to any number, arrangement, sequence, or order of material layers, as well as the specific compositions associated with these layers unless otherwise noted herein. Many different combinations of materials and layer-orders are possible provided that the completed bladder side wall includes at least one layer of material containing in whole or in part polyethylene naphthalate. Regarding the permitted variations associated with this invention, further layers of (1) additional reinforcement composition(s) as defined above; and (2) polyethylene naphthalate (in whole or in part) can be placed on the top, bottom, or anywhere within the structures shown in FIGS. 6–9 without limitation.

In order to manufacture the bladder units described herein, many conventional production methods may be employed including the use of standard heat-based molding systems. These devices mold the completed film products which contain the materials listed above into a desired shape (e.g. a bladder or bag-type configuration) using an appropriately-shaped molding member. The bladder may also be assembled from two interconnected halves produced using the claimed film products which are adhered together by standard thermal welding processes or various adhesive materials (including the adhesive compositions listed above in connection with the "tie" layers, as well as standard epoxy or cyanoacrylate adhesives). This type of assembly method is shown and discussed in co-owned and co-pending U.S. patent application No. 08/869,446 (filed on Jun. 5, 1997) which is again incorporated herein by reference.

Furthermore, another bladder production method is described in co-owned U.S. Pat. No. 5,975,686 which is again incorporated herein by reference. This application should therefore be consulted for further information regarding preferred production processes although the claimed invention shall not be restricted to any given construction techniques. In accordance with the method outlined in U.S. Pat. No. 5,975,686, a flat sheet of side wall material (see FIGS. 6–9) is cut and placed on a die plate, followed by the application of heat and a vacuum to the sheet. Thereafter, the product is heat staked and folded, followed by trimming as needed to yield the final bladder unit.

C. Additional Information and Methods of Use

In accordance with the data provided above, the claimed bladder side wall designs (including side walls 100, 200, 300, 400 presented in FIGS. 6–9) can be used in the ink delivery system of FIGS. 1–5 (and ink containment vessel 38 and/or ink reservoir unit 28 associated therewith). Likewise, the bladder designs described herein may be employed in a wide variety of other ink delivery systems provided that they include an ink containment vessel and a printhead operatively connected thereto which comprises at least one ink ejector for expelling ink on demand therefrom. The phrase "operatively connected" relative to the ink containment vessel and printhead is defined above to involve direct physical attachment of the vessel to the printhead or remote attachment using one or more ink transfer conduits. The ink containment vessel will contain the bladder members of the present invention therein which are designed to (1) selectively inflate or deflate in order to control system back pressure levels (preferred); or (2) retain a supply of ink therein. Regardless of the various configurations discussed above and the functional capabilities of the bladder units, the claimed invention is applicable to many different systems provided that the bladders incorporate a side wall structure which again contains at least one layer made in whole or in part of polyethylene naphthalate.

The present invention shall likewise encompass a novel method for producing a high-durability, low maintenance ink delivery system which is able to maintain proper pressure levels within the system. As previously noted, the system of primary interest involves a flexible bladder positioned within an ink delivery system comprising an ink containment vessel and a supply of ink retained within the vessel. In a preferred and non-limiting embodiment, the bladder is designed to maintain proper pressure levels within the ink containment vessels which are controlled by inflation and deflation of the bladder. All of these components including the novel bladder structures are discussed above in Sections "A" and "B" which are entirely applicable to the method outlined in this section. In this regard, the specific data encompassed within Sections "A" and "B" is incorporated by reference in the present section.

The method of interest specifically involves the steps of (1) providing an ink delivery system having a printhead which includes at least one ink ejector for expelling ink on demand from the printhead; (2) providing an ink containment vessel operatively connected to and in fluid communication with the printhead as indicated above; and (3) placing a flexible bladder within the ink containment vessel which, when inflated and deflated, maintains proper pressure levels in the ink containment vessel. In step (3), the bladder positioned within the ink containment vessel has a side wall which prevents air and ink materials from passing therethrough. The side wall is optimally constructed in whole or in part from polyethylene naphthalate as defined above and discussed extensively in Section "B" which is again incorporated by reference in the present discussion.

While a single layer of material may be employed in connection with the side wall (See FIG. 6 and the accompanying discussion thereof), it can also be produced from a plurality of material layers secured together. In such a multi-layer embodiment, at least one of the layers is produced in whole or in part from polyethylene naphthalate and at least another one of the layers is constructed from an additional reinforcement composition. Representative additional reinforcement compositions are listed above in Section "B" along with other information concerning the bladder member (and multi-layer side wall) which shall be entirely applicable to the claimed method. In particular, see FIGS. 7–9 and the accompanying discussion of these figures. In accordance with this method, a durable system is created which is able to effectively control back pressure levels using a flexible bladder that is characterized by substantially improved longevity and ink corrosion resistance.

In conclusion, the present invention represents a significant advance in the art of ink printing technology and the generation of high-quality images. The structures, components, and methods outlined herein provide many important benefits including: (1) the avoidance of ink corrosion problems and air leakage into and out of the bladder in the claimed ink delivery system; (2) improved bladder longevity; and (3) the maintenance of high print quality levels over time. The invention is therefore unique, versatile, and able to offer numerous benefits in many different printing applications.

Having herein set forth preferred embodiments of the invention, it is anticipated that suitable modifications may be made thereto by individuals skilled in the relevant art which nonetheless remain within the scope of the invention. For example, the invention shall not be limited to any particular ink delivery systems, ink ejectors, operational parameters, dimensions, ink compositions, bladder designs, bladder functions, and component orientations within the general guidelines set forth above unless otherwise indicated herein. Likewise, any references to components in the singular shall likewise encompass the use of such components in multiple quantities unless otherwise indicated above. The present invention shall therefore only be construed in accordance with the following claims:

The invention that is claimed is:

1. An ink delivery system for use in printing images on a substrate comprising:

a printhead comprising at least one ink ejector for expelling ink on demand from said printhead; and an ink containment vessel operatively connected to and in fluid communication with said printhead, said ink containment vessel comprising a flexible bladder positioned therein which, when inflated and deflated, maintains proper pressure levels within said ink containment vessel, said bladder comprising a side wall which prevents air and ink materials from passing therethrough, said side wall being comprised of polyethylene naphthalate.

2. The ink delivery system of claim 1 wherein said side wall of said bladder has a thickness of about 0.25–3.0 mil.

3. An ink delivery system for use in printing images on a substrate comprising:

a printhead comprising at least one ink ejector for expelling ink on demand from said printhead; and an ink containment vessel operatively connected to and in fluid communication with said printhead, said ink containment vessel comprising a flexible bladder positioned therein which, when inflated and deflated, maintains proper pressure levels within said ink containment vessel, said bladder comprising a side wall which prevents air and ink materials from passing therethrough, said side wall being comprised of a plurality of material layers secured together, with at least one of said layers being comprised of polyethylene naphthalate and at least another one of said layers being comprised of an additional reinforcement composition.

4. The ink delivery system of claim 3 wherein said additional reinforcement composition is selected from the group consisting of polyvinylidene chloride, polyvinylidene fluoride, ethylene vinyl alcohol copolymer, polyethylene, ethylene chlorotrifluoroethylene copolymer, polychlorotrifluoroethylene, at least one liquid crystal polymer, at least one elemental metal, aluminum oxide, silicon dioxide, diamond-like carbon, and mixtures thereof.

5. The ink delivery system of claim 3 wherein said one of said layers comprised of polyethylene naphthalate has a thickness of about 0.25–3.0 mil.

6. An ink delivery system for use in printing images on a substrate comprising:

a printhead comprising at least one ink ejector for expelling ink on demand from said printhead; and an ink containment vessel operatively connected to and in fluid communication with said printhead, said ink containment vessel comprising a flexible bladder positioned therein which, when inflated and deflated, maintains proper pressure levels within said ink containment vessel, said bladder comprising a side wall which prevents air and ink materials from passing therethrough, said side wall being comprised of a plurality of material layers secured together, said plurality of material layers comprising an upper layer comprised of polyethylene, a lower layer comprised of polyethylene, and a medial layer comprised of polyethylene naphthalate which is positioned between said upper layer and said lower layer.

7. The ink delivery system of claim 6 wherein said upper layer in said side wall of said bladder has a thickness of about 0.25–3.0 mil.

8. The ink delivery system of claim 6 wherein said lower layer in said side wall of said bladder has a thickness of about 0.25–3.0 mil.

9. The ink delivery system of claim 6 wherein said medial layer in said side wall of said bladder has a thickness of about 0.25–3.0 mil.

10. A method for producing a high-durability, low maintenance ink delivery system which is able to maintain proper pressure levels therein comprising:

providing a printhead comprising at least one ink ejector for expelling ink on demand from said printhead, and an ink containment vessel operatively connected to and in fluid communication with said printhead; and placing a flexible bladder in said ink containment vessel which, when inflated and deflated, maintains proper pressure levels within said ink containment vessel, said bladder comprising a side wall which prevents air and ink materials from passing therethrough, said side wall being comprised of polyethylene naphthalate.

11. The method of claim 10 wherein said side wall of said bladder has a thickness of about 0.25–3.0 mil.

12. A method for producing a high-durability, low maintenance ink delivery system which is able to maintain proper pressure levels therein comprising:

providing a printhead comprising at least one ink ejector for expelling ink on demand from said printhead, and an ink containment vessel operatively connected to and in fluid communication with said printhead; and placing a flexible bladder in said ink containment vessel which, when inflated and deflated, maintains proper pressure levels within said ink containment vessel, said bladder comprising a side wall which prevents air and ink materials from passing therethrough, said side wall being comprised of a plurality of material layers secured together, with at least one of said layers being comprised of polyethylene naphthalate and at least another one of said layers being comprised of an additional reinforcement composition.

13. The method of claim 12 wherein said additional reinforcement composition is selected from the group consisting of polyvinylidene chloride, polyvinylidene fluoride, ethylene vinyl alcohol copolymer, polyethylene, ethylene chlorotrifluoroethylene copolymer, polychlorotrifluoroethylene, at least one liquid crystal polymer, at least one elemental metal, aluminum oxide, silicon dioxide, diamond-like carbon, and mixtures thereof.

* * * * *